US011613184B1

(12) United States Patent
Wiegman

(10) Patent No.: US 11,613,184 B1
(45) Date of Patent: Mar. 28, 2023

(54) SYSTEMS AND METHODS FOR DISABLING AN ELECTRIC VEHICLE DURING CHARGING

(71) Applicant: BETA AIR, LLC, South Burlington, VT (US)

(72) Inventor: Herman Wiegman, South Burlington, VT (US)

(73) Assignee: BETA AIR, LLC, South Burlington, VT (US)

( * ) Notice: Subject to any disclaimer, the term of this patent is extended or adjusted under 35 U.S.C. 154(b) by 0 days.

(21) Appl. No.: 17/515,501

(22) Filed: Oct. 31, 2021

(51) Int. Cl.
*H02J 7/00* (2006.01)
*H02J 7/14* (2006.01)
*B60L 53/16* (2019.01)
*B60L 53/60* (2019.01)

(52) U.S. Cl.
CPC .............. *B60L 53/16* (2019.02); *B60L 53/60* (2019.02); *H02J 7/0031* (2013.01); *H02J 7/0036* (2013.01); *H02J 7/0042* (2013.01); *B60L 2200/10* (2013.01)

(58) Field of Classification Search
CPC ........ B60L 53/16; B60L 53/60; H02J 7/0031; H02J 7/0036; H02J 7/0042
USPC .................................................. 320/104, 109
See application file for complete search history.

(56) References Cited

U.S. PATENT DOCUMENTS

| 5,462,439 | A | 10/1995 | Keith |
| 8,299,748 | B2 | 10/2012 | Soma |
| 8,600,593 | B2 | 12/2013 | Ohno |
| 8,618,767 | B2 | 12/2013 | Ishii |
| 8,779,719 | B2* | 7/2014 | Matsuki ................. B60L 53/68 320/109 |
| 8,810,060 | B2 | 8/2014 | Kamaga |
| 9,592,744 | B2 | 3/2017 | Zhao |
| 9,889,758 | B2 | 2/2018 | Ueo |
| 10,361,576 | B2 | 7/2019 | Nomura |
| 11,099,561 | B1* | 8/2021 | Kentley-Klay ......... G06F 16/29 |
| 11,264,827 | B2* | 3/2022 | Wu ......................... B60L 53/22 |
| 2009/0085522 | A1* | 4/2009 | Matsumoto ........... B60W 10/26 320/137 |
| 2009/0096416 | A1* | 4/2009 | Tonegawa ............. B60W 20/00 320/109 |

(Continued)

FOREIGN PATENT DOCUMENTS

| EP | 2672605 A1 | 12/2013 |
| EP | 3617721 A1 | 3/2020 |

*Primary Examiner* — Alexis B Pacheco
(74) *Attorney, Agent, or Firm* — Caldwell Intellectual Property Law

(57) ABSTRACT

A system for disabling an electric vehicle during charging, including an energy storage device, the energy storage device attached to an electric vehicle. T The system including a charging port, wherein the charging port is configured to engage with a charging connector, the charging port disposed on the electric vehicle and electrically connected to the energy storage device. The system also including a presence sensor, the presence sensor communicatively connected to the charging port, the presence sensor configured to detect whether the charging connector is engaged with the charging port. Additionally, the system including an interlock component, the interlock component configured to disable the electric vehicle when the charging connector is engaged with the charging port.

20 Claims, 7 Drawing Sheets

(56) References Cited

U.S. PATENT DOCUMENTS

| | | | |
|---|---|---|---|
| 2010/0219794 A1* | 9/2010 | Sugimoto | H02M 1/10 320/128 |
| 2011/0016333 A1* | 1/2011 | Scott | G06F 1/266 713/300 |
| 2011/0048826 A1* | 3/2011 | Starr | B60L 3/00 320/150 |
| 2011/0169448 A1* | 7/2011 | Ichikawa | B60L 58/12 320/109 |
| 2011/0178663 A1* | 7/2011 | Crombez | B60W 10/06 903/903 |
| 2011/0187184 A1* | 8/2011 | Ichikawa | B60L 55/00 307/10.1 |
| 2012/0089290 A1* | 4/2012 | Kato | B60L 3/0046 701/22 |
| 2012/0091954 A1* | 4/2012 | Matsuki | B60L 53/68 320/109 |
| 2013/0090797 A1* | 4/2013 | Izumi | H02J 7/04 701/22 |
| 2013/0106365 A1* | 5/2013 | Ang | H02M 3/158 320/138 |
| 2014/0002023 A1* | 1/2014 | Ichikawa | B60L 53/22 320/109 |
| 2014/0028256 A1* | 1/2014 | Sugiyama | B60L 53/22 320/109 |
| 2014/0132210 A1* | 5/2014 | Partovi | H02J 50/90 320/108 |
| 2014/0203634 A1* | 7/2014 | Sugiyama | B60L 53/22 307/10.1 |
| 2014/0371968 A1* | 12/2014 | Sakamoto | B60L 50/16 701/22 |
| 2015/0066257 A1* | 3/2015 | Ochocinski | B60L 53/60 180/65.21 |
| 2015/0097525 A1* | 4/2015 | DeDona | B60L 1/006 320/109 |
| 2015/0191162 A1* | 7/2015 | Dao | H04Q 9/00 701/22 |
| 2017/0213468 A1 | 7/2017 | Duerksen | |
| 2018/0105060 A1* | 4/2018 | Mcquillen | H02J 7/0068 |
| 2018/0257492 A1* | 9/2018 | O'Hara | H01M 10/0525 |
| 2019/0270526 A1* | 9/2019 | Hehn | B64C 39/024 |
| 2019/0291599 A1* | 9/2019 | Andou | B60L 50/75 |
| 2019/0356141 A1* | 11/2019 | Kersey | H01M 50/296 |
| 2020/0062138 A1 | 2/2020 | Smolenaers | |
| 2020/0094979 A1 | 3/2020 | Zheng | |
| 2020/0189413 A1 | 6/2020 | Fagan | |
| 2020/0223319 A1* | 7/2020 | Uhlenbrock | B60L 53/305 |
| 2020/0384872 A1* | 12/2020 | Nakabayashi | G01R 31/36 |
| 2021/0159554 A1* | 5/2021 | Rogers | H01M 50/507 |
| 2021/0237596 A1 | 8/2021 | Butina | |
| 2022/0126711 A1* | 4/2022 | Mackenzie | B60L 53/12 |

* cited by examiner

SYSTEMS AND METHODS FOR DISABLING AN ELECTRIC VEHICLE DURING CHARGING

FIELD OF THE INVENTION

The present invention generally relates to the field of electric vehicle charging methods and systems. In particular, the present invention is directed to systems and methods for disabling an electric vehicle during charging.

BACKGROUND

In electric vehicle charging systems, there exists a need to deactivate electric vehicles while they are charging. This may prevent the electric vehicle from operating while plugged into a charger. This allows for greater safety in electric vehicle charging. Existing solutions for systems and methods for disabling an electric vehicle during charging do not resolve this issue in a satisfactory manner.

SUMMARY OF THE DISCLOSURE

In an aspect, a system for disabling an electric vehicle during charging, including an energy storage device, the energy storage device attached to an electric vehicle. The system also including a charging port, wherein the charging port is configured to engage with a charging connector, the charging port disposed on the electric vehicle and electrically connected to the energy storage device. The system including a presence sensor, the presence sensor communicatively connected to the charging port, the presence sensor configured to detect whether the charging connector is engaged with the charging port. The system further including an interlock component, the interlock component configured to disable the electric vehicle when the charging connector is engaged with the charging port.

In another aspect, a method of disabling an electric vehicle during charging, including receiving a signal from a presence sensor communicatively connected to a charging port, detecting, based on the signal, whether the charging connector is engaged with the charging port, and disabling an interlock component if the charging connector is detected to be engaged with the charging port, wherein disabling the interlock component disables an electric vehicle.

These and other aspects and features of non-limiting embodiments of the present invention will become apparent to those skilled in the art upon review of the following description of specific non-limiting embodiments of the invention in conjunction with the accompanying drawings.

BRIEF DESCRIPTION OF THE DRAWINGS

For the purpose of illustrating the invention, the drawings show aspects of one or more embodiments of the invention. However, it should be understood that the present invention is not limited to the precise arrangements and instrumentalities shown in the drawings, wherein.

DETAILED DESCRIPTION

At a high level, aspects of the present disclosure are directed to systems and methods for disabling an electric vehicle during charging. In an embodiment, the system may use an interlock component to enable and disable an electric vehicle while the electric vehicle is being charged.

Aspects of the present disclosure can be used to disable an electric vehicle during charging. Particularly, aspects of the present disclosure can be used to detect when an electric vehicle is being charged.

Aspects of the present disclosure prevent an electric vehicle from operating while connected to a charger. Exemplary embodiments illustrating aspects of the present disclosure are described below in the context of several specific examples.

Figure 1:
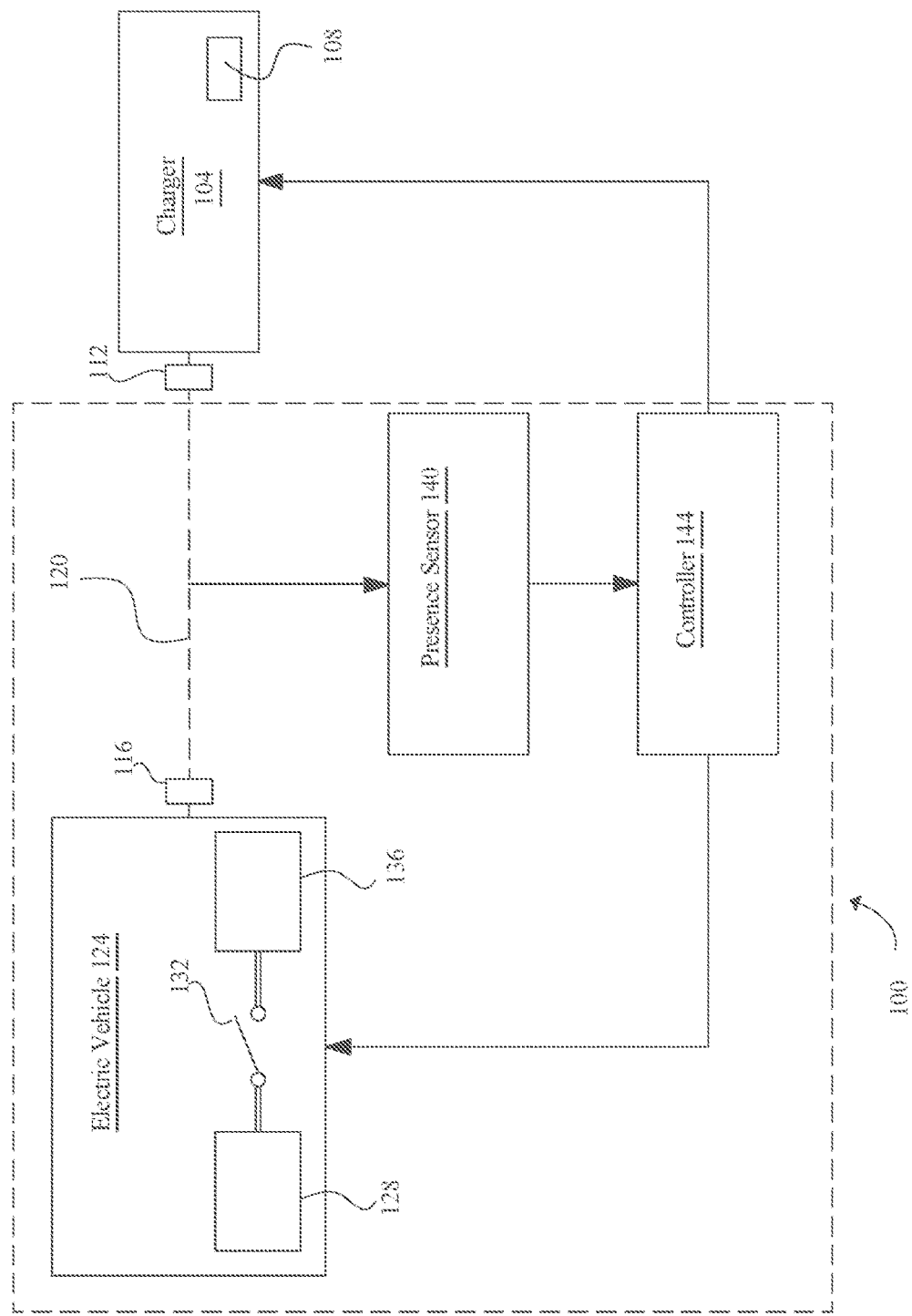
FIG. 1 is a diagram depicting an embodiment of a system for disabling an electric vehicle during charging.

Referring now to FIG. 1, a system 100 for disabling an electric vehicle during charging is depicted in accordance with one or more embodiments of the present disclosure. System 100 is adapted to interface with a charger 104, charger 104 including a power source 108 and a charging connector 112. In some embodiments, power source 108 may be an energy storage device, such as, for example, a battery or a plurality of batteries. An "energy storage device," for the purposes of this disclosure may include any energy source where chemical energy is stored and may be converted into electrical energy. A battery may include, without limitation, a battery using nickel based chemistries such as nickel cadmium or nickel metal hydride, a battery using lithium ion battery chemistries such as a nickel cobalt aluminum (NCA), nickel manganese cobalt (NMC), lithium iron phosphate (LiFePO4), lithium cobalt oxide (LCO), and/or lithium manganese oxide (LMO), a battery using lithium polymer technology, lead-based batteries such as without limitation lead acid batteries, metal-air batteries, or any other suitable battery. Additionally, power source 108 need not be made up of only a single electrochemical cell, it can consist of several electrochemical cells wired in series or in parallel. In other embodiments, power source 108 may be a connection to the power grid. For example, in some non-limiting embodiments, power source 108 may include a connection to a grid power component. Grid power component may be connected to an external electrical power grid. In some other embodiments, the external power grid may be used to charge batteries, for example, when power source 108 includes batteries. In some embodiments, grid power component may be configured to slowly charge one or more batteries in order to reduce strain on nearby electrical power grids. In one embodiment, grid power component may have an AC grid current of at least 450 amps. In some embodiments, grid power component may have an AC grid current of more or less than 450 amps. In one embodiment, grid power component may have an AC voltage connection of 480 Vac. In other embodiments, grid power component may have an AC voltage connection of above or below 480 Vac. Charger 104 may be consistent with the charger disclosed in U.S. application Ser. No. 17/477,987 filed on Sep. 30, 2021, titled "Systems and Methods for Adaptive Electric Vehicle reference. Additionally, charger 104 may be consistent with the charger disclosed in U.S. application Ser. No. 17/515,448 filed on Oct. 30, 2021, titled "Systems and Methods for an Immediate Shutdown of an Electric Vehicle Charger," the entirety of which is hereby incorporated by reference. In some embodiments, charger 128 may draw power from the power grid to be used for charging without being stored in a battery.

With continued reference to FIG. 1, system 100 includes a charging port 116, charging port 116 configured to engage with charging connector 112. Charging connector 112 and charging port 116, when engaged together, form a charging connection 120. Charging port 116 may include one or more sockets adapted to interface with pins disposed on charging connector 112. As a non-limiting example, charging port 116 may include one or more direct current (DC) sockets. The DC sockets may carry DC power as part of the charging connection 120. As another non-limiting example, charging port 116 may include one or more alternating current (AC) sockets. The AC sockets may carry AC power as part of the charging connection 120. As another non-limiting example, charging connector 112 may include on or more ground sockets. Ground sockets may provide a ground connection.

With continued reference to FIG. 1, an electric vehicle 124 includes the aforementioned charging port 116, an energy storage device 128, an interlock component 132, and a load 136. Electric vehicle 124 may be any machine used for transportation that uses an electric motor for propulsion. In some non-limiting embodiments, electric vehicle may be an electric airplane. Charging port 116 is configured to engage with charging connector 112. For the purposes of this disclosure, "engage with" means to physically connect together at least two components such that an electrical connection between the at least two components is formed. As a non-limiting example, this may include the pins of charging connector 112 being inserted into sockets on charging port 116. As another non-limiting example, this may include electric contacts on the surface of charging port 116 and charging connector 112 being placed in contact with one other. As another non-limiting example, "engaged with" can include wireless charging solutions where electricity is transferred from charging connector 112 to charging port 116, and charging connector 112 and charging port 116 are in physical contact with one another, but no electrical wires connect the two. Charging port 116 may be disposed on electric vehicle 124.

With continued reference to FIG. 1, charging port 116 is electrically connected to energy storage device 128. Energy storage device 128 may be, in some embodiments, a battery. A battery may include, without limitation, a battery using nickel based chemistries such as nickel cadmium or nickel metal hydride, a battery using lithium ion battery chemistries such as a nickel cobalt aluminum (NCA), nickel manganese cobalt (NMC), lithium iron phosphate (LiFePO4), lithium cobalt oxide (LCO), and/or lithium manganese oxide (LMO), a battery using lithium polymer technology, lead-based batteries such as without limitation lead acid batteries, metal-air batteries, or any other suitable battery. Additionally, power source 308 need not be made up of only a single electrochemical cell; it may consist of several electrochemical cells wired in series or in parallel. Exemplary energy storage devices are disclosed in detail in U.S. patent application Ser. Nos. 16/948,157 and 16/048,140 both entitled "SYSTEM AND METHOD FOR HIGH ENERGY DENSITY BATTERY MODULE", which are incorporated in their entirety herein by reference. Energy storage device 128 may be attached to electric vehicle 124. "Attached to," for the purposes of this disclosure includes both indirect and direct attachment.

With continued reference to FIG. 1, load 136 may include an electric motor. In some embodiments, load 136 may include flight components. In some embodiments, load may include on-board electronics. Generally, in some embodiments, load 136 may be any component that draws power from energy storage device 128 when electric vehicle 124 is in its operating configuration. For the purposes of this disclosure, "operating configuration" may include driving, flying, cycling, boating, and the like.

With continued reference to FIG. 1, interlock component 132 has an engaged state and a disengaged state. For the purposes of this disclosure, an "interlock component" is a component that ensures that one or more conditions are met before enabling or disabling an electric connection. In its engaged state, interlock component electrically connects energy storage device 128 to load 136. In its disengaged state, interlock component does not electrically connect energy storage device 128. For the purposes of this disclosure, "electrically connect" means forming a connection through which electricity may flow. Interlock component 132 may include any device configured to allow current flow in one state and disallow current flow in another state. As a non-limiting example, interlock component 132 may be a relay. A relay is an electrically and/or electromechanically operated switch that can receive control signals. A relay can be engaged or disengaged by the control signals. A relay need not have any moving parts and can be solid state. As another non-limiting example, interlock component 132 may be a mechanical switch.

With continued reference to FIG. 1, interlock component 132 is may be configured to "disable" electric vehicle 124. For the purposes of this disclosure, disabling the electric vehicle means, in the context of FIG. 1, disconnecting energy storage device 128 from load 136 such that energy storage device 128 and load 136 are not electrically connected. As a non-limiting example, this may include disconnecting energy storage device 128 from an electric motor on board the electric vehicle. In some embodiments, disabling the electric vehicle may include disconnecting a battery bus (or "bus") from a load. As a non-limiting example, this may include disconnecting a bus from a propulsor or a flight component. As another non-limiting example, this may include disconnecting a bus from an actuator, such as, for example, an actuator attached to a control surface on an electric aircraft. As another non-limiting example, this may include disconnecting the bus from a flight component on an electric aircraft. As another non-limiting example, this may include disconnecting a bus from a computer system such as, for example, a flight controller or navigation system. In some embodiments, the bus may be a ring bus. The bus may be consistent with any bus element, such as a ring bus, disclosed in U.S. application Ser. No. 17/348,240 filed on Jun. 15, 2021, titled "System and Method for Dynamic Excitation of an Energy Storage Element Configured for Use in an Electric Aircraft," the entirety of which is hereby incorporated by reference.

With continued reference to FIG. 1, interlock component 132 may be configured to "enable" the electric vehicle 124. For the purposes of this disclosure, enabling the electric vehicle means, in the context of FIG. 1, connecting energy storage device 128 to load 136 such that energy storage device 128 and load 136 are electrically connected. As a non-limiting example, this may include connecting energy storage device 128 to an electric motor on board the electric vehicle. In some embodiments, enabling the electric vehicle may include connecting a battery bus (or "bus") to a load. As a non-limiting example, this may include connecting a bus to a propulsor or a flight component. As another non-limiting example, this may include connecting a bus to an actuator, such as, for example, an actuator attached to a control surface on an electric aircraft. As another non-limiting example, this may include connecting the bus to a flight component on an electric aircraft. As another non-limiting example, this may include connecting a bus to a computer system such as, for example, a flight controller or navigation system. In some embodiments, the bus may be a ring bus.

With continued reference to FIG. 1, a presence sensor 140 is communicatively connected to charging port 116. Presence sensor 140 is configured to detect whether charging connector 112 is engaged with charging port 116. In some embodiments, presence sensor 140 may be an electrical sensor. As a non-limiting example, presence sensor 140 may be a continuity sensor. A continuity sensor is a sensor that measures whether an electrical path between two points. In this embodiment, for example, the continuity sensor could measure whether a socket on charging port 116 is part of an electrical path. In this embodiment, if the continuity sensor detects that there is no continuity, then this may indicate that charging port 116 is not engaged with charging connector 112. Alternatively, in other embodiments, presence sensor 140 may be an ammeter that measures the current through a socket on charging port 116. In this embodiment, the absence of current may indicate that charging port 116 is not engaged with charging connector 112, whereas the presence of current may indicate that charging port 116 is engaged with charging connector 112. In other embodiments, presence sensor 140 may be another type of electrical sensor such as, for example, a voltmeter or ohmmeter. For the purposes of this disclosure, "electrical sensor" means a sensor that measures an electrical property such as current, resistance, capacitance, impedance, voltage, and the like. In some embodiments, presence sensor 140 may be an electromagnetic effect sensor, such as, for example a Hall effect sensor. Broadly, a Hall effect sensor measures the difference in voltage across a conductor due to a magnetic field. In some embodiments, presence sensor 140 may be a contact sensor. "Contact sensor," for the purposes of this disclosure, means a sensor that senses physical contact between two surfaces or points. As a non-limiting example, in this embodiment, a contact sensor may detect contact between a face of charging port 116 and charging connector 112. In this embodiment, the detection of contact would mean that charging port 116 and charging connector 112 may be engaged, whereas the absence of the detection of contact would mean that charging port 116 and charging connector 112 may not be engaged. As a non-limiting example, presence sensor 140 may be force-sensing resistor, where the resistance of the resistor changes when a force, pressure, or mechanical stress is applied. In some embodiments, presence sensor 140 may be a time-of-flight sensor. A time-of-flight sensor measure the time between the emission of a signal and its return to the time-of-flight sensor in order to measure the distance between the time-of-flight sensor and an object. In other words, the signal will take longer to traverse the distance between the time-of-flight sensor and the object, and then return to the time-of-flight sensor, if the object is far away from the time-of-flight sensor. A time-of-flight sensor may use various different signals in order to conduct its measurements. For instance, a time-of-flight sensor may use ultrasound, infrared light, or a laser as a signal. One of ordinary skill in the art would appreciate that, after reviewing this disclosure in its entirety, a variety of sensors may be used as presence sensor 140.

With continued reference to FIG. 1, presence sensor 140 may be part of a sensor suite. Sensor suite may include a sensor or plurality thereof that may detect voltage, current, resistance, capacitance, temperature, or inductance; detection may be performed using any suitable component, set of components, and/or mechanism for direct or indirect measurement, including without limitation comparators, analog to digital converters, any form of voltmeter, or the like. Sensor suite may include digital sensors, analog sensors, or a combination thereof. Sensor suite may include digital-to-analog converters (DAC), analog-to-digital converters (ADC, A/D, A-to-D), a combination thereof, or other signal conditioning components used in transmission of a resistance datum over wired or wireless connection.

With continued reference to FIG. 1, Sensor suite may measure an electrical property at an instant, over a period of time, or periodically. Sensor suite may be configured to operate at any of these detection modes, switch between modes, or simultaneous measure in more than one mode.

With continued reference to FIG. 1, sensor suite may include thermocouples, thermistors, thermometers, passive infrared sensors, resistance temperature sensors (RTD's), semiconductor based integrated circuits (IC), a combination thereof or another undisclosed sensor type, alone or in combination. Temperature, for the purposes of this disclosure, and as would be appreciated by someone of ordinary skill in the art, is a measure of the heat energy of a system. Temperature, as measured by any number or combinations of sensors present within sensor suite, may be measured in Fahrenheit (° F.), Celsius (° C.), Kelvin (° K), or another scale alone or in combination. The temperature measured by sensors may comprise electrical signals which are transmitted to their appropriate destination through a wireless or wired connection.

With continued reference to FIG. 1, presence sensor 140 may be communicatively connected to a controller 144. Presence sensor 140 may communicate with controller 144 using an electric connection. Alternatively, presence sensor 140 may communicate with controller 144X wirelessly, such as by radio waves, Bluetooth, or WiFi. One of ordinary skill in the art, upon reviewing the entirety of this disclosure, would recognize that a variety of wireless communication technologies are suitable for this application.

With continued reference to FIG. 1, controller 144 may be communicatively connected with interlock component 132. Controller 144 may be configured to receive measurements from presence sensor 140. When controller 144 receives measurements from presence sensor 140 that indicate that charging port 116 and charging connector 112 are engaged, then controller 144 may send a communication to interlock component 132, triggering interlock component to enter its disengaged state. In some embodiments, when interlock component is in its disengaged state, controller 144 may be further configured to monitor presence sensor 140 for measurements that indicate that charging port 116 and charging connector 112. In these embodiments, when the controller 144 detects these measurements, the controller 144 may be configured to send a communication to interlock component 132, triggering interlock component 132 to enter its engaged state.

With continued reference to FIG. 1, in some embodiments, controller 144 may be implemented using an analog circuit. For example, in some embodiments controller 144 may be implemented using an analog circuit using operational amplifiers, comparators, transistors, or the like. In some embodiments, controller 144 may be implemented using a digital circuit having one or more logic gates. In some embodiments, controller may be implemented using a combinational logic circuit, a synchronous logic circuit, an asynchronous logic circuit, or the like. In other embodiments, controller 144 may be implemented using an application specific integrated circuit (ASIC). In yet other embodiments, controller 144 may be implemented using a field programmable gate array (FPGA) and the like.

With continued reference to FIG. 1, in some embodiments, controller 144 may be a computing device, flight controller, processor, control circuit, or the like. With continued reference to FIG. 1, controller 144 may include any computing device as described in this disclosure, including without limitation a microcontroller, microprocessor, digital signal processor (DSP) and/or system on a chip (SoC) as described in this disclosure. Computing device may include, be included in, and/or communicate with a mobile device such as a mobile telephone or smartphone. controller 144 may include a single computing device operating independently, or may include two or more computing device operating in concert, in parallel, sequentially or the like; two or more computing devices may be included together in a single computing device or in two or more computing devices. controller 144 may interface or communicate with one or more additional devices as described below in further detail via a network interface device. Network interface device may be utilized for connecting controller 144 to one or more of a variety of networks, and one or more devices. Examples of a network interface device include, but are not limited to, a network interface card (e.g., a mobile network interface card, a LAN card), a modem, and any combination thereof. Examples of a network include, but are not limited to, a wide area network (e.g., the Internet, an enterprise network), a local area network (e.g., a network associated with an office, a building, a campus or other relatively small geographic space), a telephone network, a data network associated with a telephone/voice provider (e.g., a mobile communications provider data and/or voice network), a direct connection between two computing devices, and any combinations thereof. A network may employ a wired and/or a wireless mode of communication. In general, any network topology may be used. Information (e.g., data, software etc.) may be communicated to and/or from a computer and/or a computing device. controller 144 may include but is not limited to, for example, a computing device or cluster of computing devices in a first location and a second computing device or cluster of computing devices in a second location. controller 144 may include one or more computing devices dedicated to data storage, security, distribution of traffic for load balancing, and the like. controller 144 may distribute one or more computing tasks as described below across a plurality of computing devices of computing device, which may operate in parallel, in series, redundantly, or in any other manner used for distribution of tasks or memory between computing devices.

With continued reference to FIG. 1, controller 144 may be configured to perform any method, method step, or sequence of method steps in any embodiment described in this disclosure, in any order and with any degree of repetition. For instance, controller 144 may be configured to perform a single step or sequence repeatedly until a desired or commanded outcome is achieved; repetition of a step or a sequence of steps may be performed iteratively and/or recursively using outputs of previous repetitions as inputs to subsequent repetitions, aggregating inputs and/or outputs of repetitions to produce an aggregate result, reduction or decrement of one or more variables such as global variables, and/or division of a larger processing task into a set of iteratively addressed smaller processing tasks. controller 144 may perform any step or sequence of steps as described in this disclosure in parallel, such as simultaneously and/or substantially simultaneously performing a step two or more times using two or more parallel threads, processor cores, or the like; division of tasks between parallel threads and/or processes may be performed according to any protocol suitable for division of tasks between iterations. Persons skilled in the art, upon reviewing the entirety of this disclosure, will be aware of various ways in which steps, sequences of steps, processing tasks, and/or data may be subdivided, shared, or otherwise dealt with using iteration, recursion, and/or parallel processing.

Figure 2:
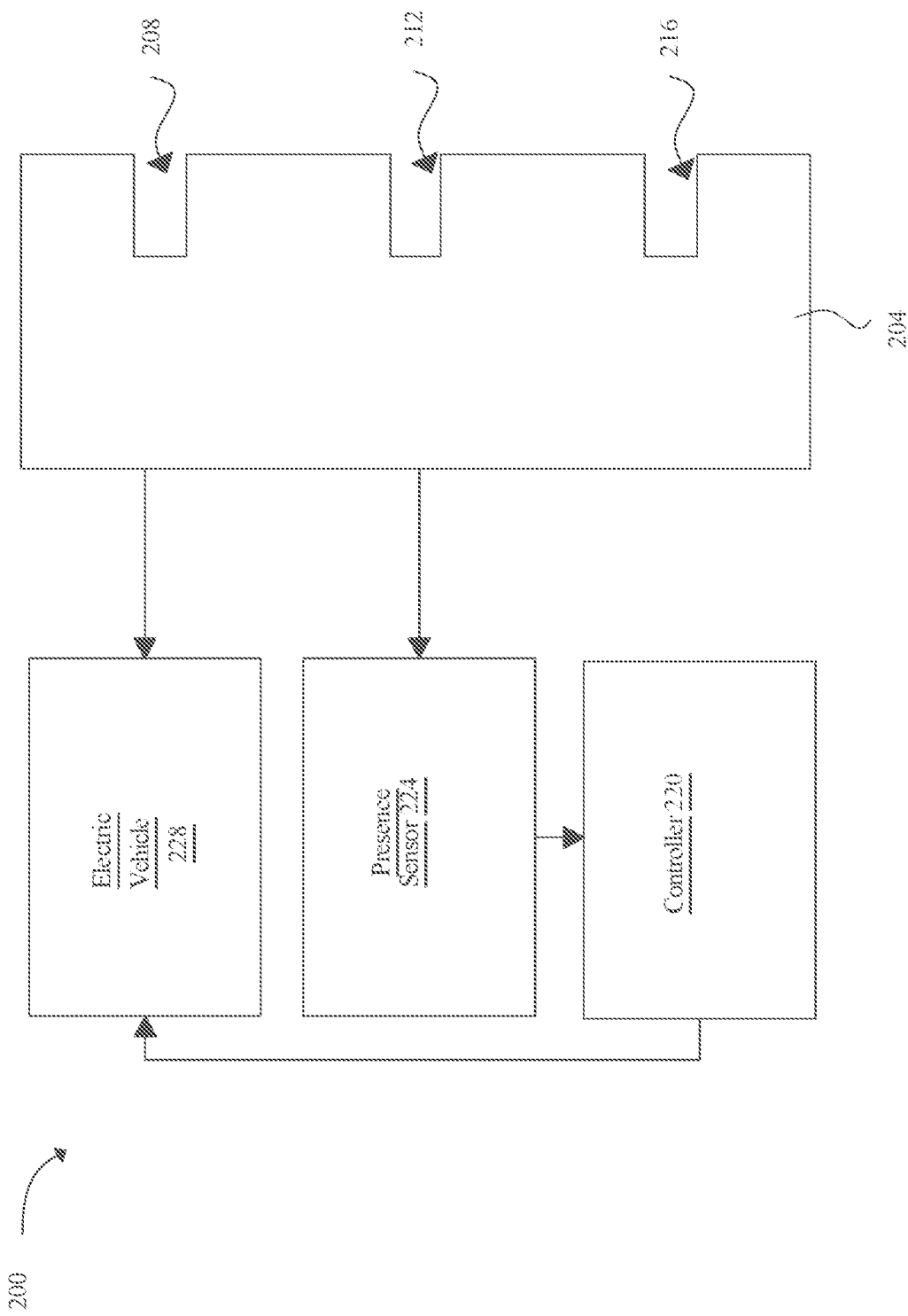
FIG. 2 is a diagram depicting an embodiment of a system for disabling an electric vehicle during charging.

Referring now to FIG. 2, a system 200 for disabling an electric vehicle during charging is depicted in accordance with one or more embodiments of the present disclosure. Charging port 204 may comprise a power socket 208, a ground socket 212, and a presence sensing socket 216. In some embodiments, power socket 208 may be adapted to receive a power pin that carries AC power. For the purposes of this disclosure, "AC power" refers to electrical power provided with a bi-directional flow of charge, where the flow of charge is periodically reversed. power pin may supply AC power at a variety of frequencies. For example, in a non-limiting embodiment, power pin may supply AC power with a frequency of 50 Hz. In another non-limiting embodiment, power pin may supply AC power with a frequency of 60 Hz. One of ordinary skill in the art, upon reviewing the entirety of this disclosure, would realize that power pin may supply a wide variety of frequencies. AC power produces a waveform when it is plotted out on a current vs. time or voltage vs. time graph. In some embodiments, the waveform of the AC power supplied by power pin may be a sine wave. In other embodiments, the waveform of the AC power supplied by power pin may be a square wave. In some embodiments, the waveform of the AC power supplied by power pin may be a triangle wave. In yet other embodiments, the waveform of the AC power supplied by power pin may be a sawtooth wave. The AC power supplied by power pin may, in general have any waveform, so long as the wave form produces a bi-directional flow of charge. AC power may be provided without limitation, from alternating current generators, "mains" power provided over an AC power network from power plants, AC power output by AC voltage converters including transformer-based converters, and/or AC power output by inverters that convert DC power, as described above, into AC power. For the purposes of this disclosure, "supply," "supplies," "supplying," and the like, include both currently supplying and capable of supplying. For example, a live pin that "supplies" DC power need not be currently supplying DC power, it can also be capable of supplying DC power. In some embodiments, power socket 208 may be adapted to receive a power pin that carries DC power. "DC power," for the purposes of this disclosure refers, to a one-directional flow of charge. For example, in some embodiments, power pin may supply power with a constant current and voltage. As another example, in other embodiments, power pin may supply power with varying current and voltage, or varying currant constant voltage, or constant currant varying voltage. In another embodiment, when charging connector is charging certain types of batteries, Power pin may support a varied charge pattern. This involves varying the voltage or currant supplied during the charging process in order to reduce or minimize battery degradation. Examples of DC power flow include half-wave rectified voltage, full-wave rectified voltage, voltage supplied from a battery or other DC switching power source, a DC converter such as a buck or boost converter, voltage supplied from a DC dynamo or other generator, voltage from photovoltaic panels, voltage output by fuel cells, or the like. In some embodiments, there may be multiple power socket 208 where both are adapted to carry DC power, both are adapted to carry AC power, or some are adapted to carry DC power and some are adapted to carry AC power.

With continued reference to FIG. 2, ground socket 212 may be adapted to receive a connection to ground. For the purpose of this disclosure, "ground" is the reference point from which all voltages for a circuit are measured. "Ground" can include both a connection the earth, or a chassis ground, where all of the metallic parts in a device are electrically connected together. In some embodiments, "ground" can be a floating ground. Ground may alternatively or additionally refer to a "common" channel or "return" channel in some electronic systems. For instance, a chassis ground may be a floating ground when the potential is not equal to earth ground. In some embodiments, a negative pole in a DC circuit may be grounded. A "grounded connection," for the purposes of this disclosure, is an electrical connection to "ground." A circuit may be grounded in order to increase safety in the event that a fault develops, to absorb and reduce static charge, and the like. Speaking generally, a grounded connection allows electricity to pass through the grounded connection to ground instead of through, for example, a human that has come into contact with the circuit. Additionally, grounding a circuit helps to stabilize voltages within the circuit.

With continued reference to FIG. 2, charging port 204 may include a presence sensing socket 216. Controller 220 may receive a current datum from the presence sensing socket 216. Presence sensing socket 216 may be electrically connected to presence sensor 224 such that presence sensor 224 may detect the presence of a charging connector.

With continued reference to FIG. 2, system 200 includes a presence sensor 224. Presence sensor 224 may be electrically connected to presence sensing socket 216. In another embodiment, presence sensor 224 may be electrically connected to power socket 208. In other embodiments, presence sensor 224 may be electrically connected to any or all sockets on charging port 204. Presence sensor 224 may be consistent with any presence sensor disclosed in this disclosure.

With continued reference to FIG. 2, system 200 includes a controller 220. Controller 220 may be communicatively connected to presence sensor 224. Controller 220 may be communicatively connected to electric vehicle 228. In some embodiments, controller 220 may be disposed within electric vehicle 228. In some embodiments, controller 220 may be electrically or communicatively connected to an interlock component consistent with any interlock component disclosed in this disclosure.

Figure 3:
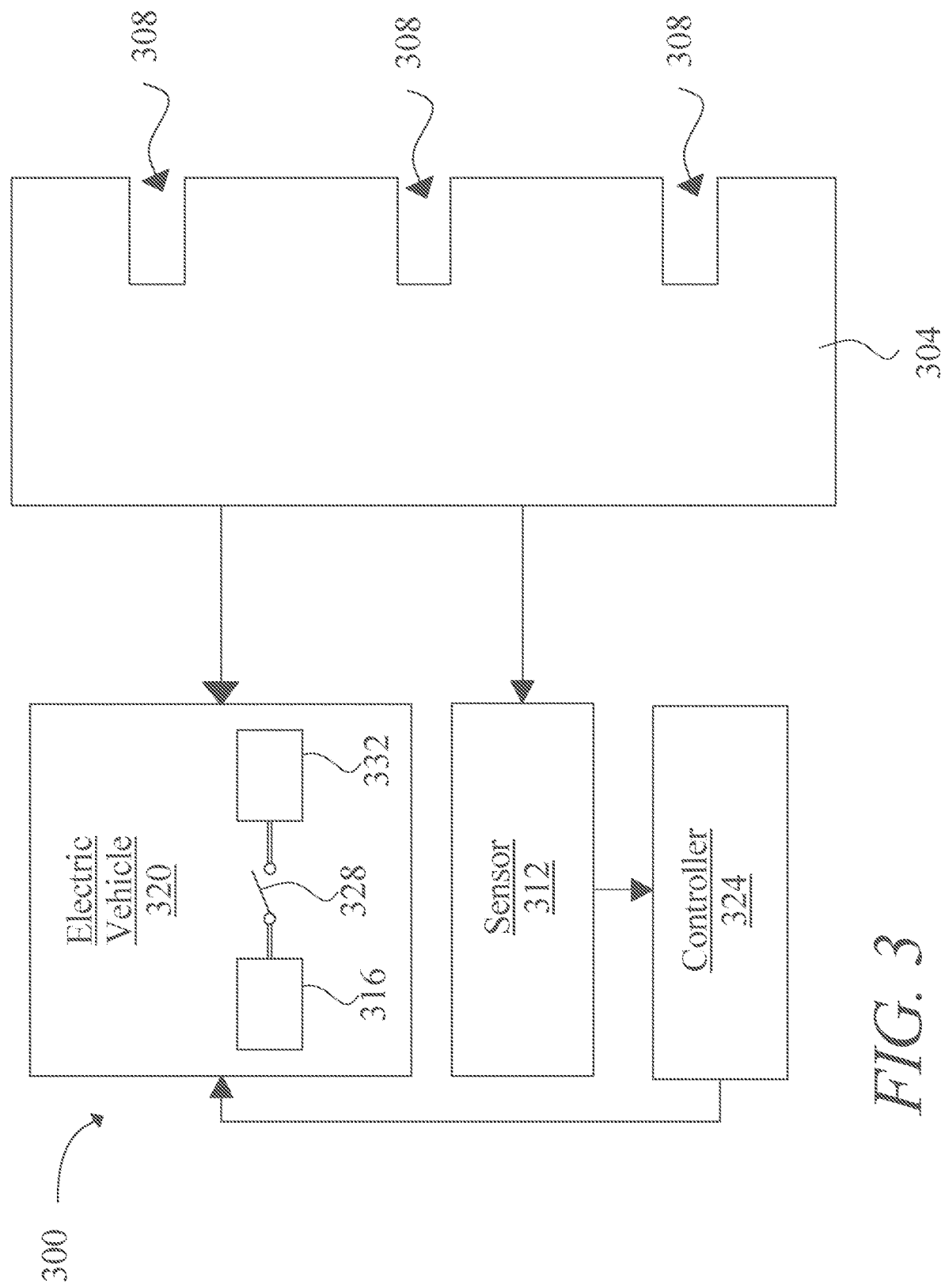
FIG. 3 is a diagram depicting an embodiment of a system for disabling an electric vehicle during charging.

Referring now to FIG. 3, system 300 for disabling an electric vehicle during charging is depicted in accordance with one or more embodiments of the present disclosure. System 300 may include a charging port 304, charging port 304 containing one or more sockets 308. Charging port 304 may be consistent with any other charging port disclosed in this disclosure. Sockets 308 may be consistent with any other sockets discussed in this disclosure. In some embodiments, sockets 308 may include a communication socket, the communication socket adapted to receive and information from a charger. In some embodiments, a communication socket of sockets 308 may transmit information to a charger.

With continued reference to FIG. 3, system 300 may include a charging sensor 312. Charging sensor 312 may be electrically connected to charging port 304. In some embodiments, charging sensor 312 may be consistent with any other sensor disclosed in this disclosure. In some embodiments, charging sensor 312 may include sensors configured to measure charging characteristics, such as physical and/or electrical parameters related to the charging connection between charging port 304 and a connector (such as, for example, charging connector 112. As used in this disclosure, a "charging characteristic" is a detectable phenomenon associated with charging an energy storage device 316. For example, and without limitation, charging sensor 312 may measure temperature and/or voltage, of battery modules and/or cells of energy storage device 316 of electric vehicle 320. Charging sensor 312 may be configured to detect failure within each battery module, for instance and without limitation, as a function of and/or using detected charging characteristics. In one or more exemplary embodiments, battery cell failure may be characterized by a spike in temperature; charging sensor 312 may be configured to detect that increase in temperature and generate a corresponding signal, such as charging datum of the communication. In other exemplary embodiments, charging sensor 312 may detect voltage and direct the charging of individual battery cells according to charge level. Detection may be performed using any suitable component, set of components, and/or mechanism for direct or indirect measurement and/or detection of voltage levels, including without limitation comparators, analog to digital converters, any form of voltmeter, or the like.

With continued reference to FIG. 3, in one or more embodiments, a charging characteristic includes temperature, voltage, current, pressure, moisture, and the like. In one or more embodiments, charging sensor 312 may be configured to detect charging characteristic of a communication between a charger and electric vehicle 320 and then transmit a sensor output signal representative of charging characteristic, where the sensor signal includes a charging datum. As used in this disclosure, a "sensor signal" is a representation of a charging characteristic that charging sensor 312 may generate. Sensor signal may include charging datum. For instance, and without limitation, charging sensor 312 is configured to generate a charging datum of a communication. For the purposes of this disclosure, a "charging datum" is a datum representing a quantifiable element of data correlated to a charging characteristic. For example, and without limitation, energy storage device 316 of electric vehicle 320 may need to be a certain temperature to operate properly; a charging datum may provide a numerical value, such as a temperature in degrees, that indicates the current temperature of a charging power source. For example, and without limitation, charging sensor 312 may be a temperature sensor that detects the temperature of an energy storage device 316 of electric vehicle 320 to be at a numerical value of 100° F. and transmits the corresponding charging datum to, for example, processor 332. In another example, and without limitation, charging sensor 312 may be a current sensor and a voltage sensor that detects a current value and a voltage value, respectively, of energy storage device 316 of an electric vehicle 320. Such charging datum may be associated with an operating condition of energy storage device 316, such as, for example, a state of charge (SoC) or a depth of discharge (DoD) of the power source. For example, and without limitation, the charging datum may include, for example, a temperature, a state of charge, a moisture level, a state of health (or depth of discharge), or the like. A sensor signal may include any signal form described in this disclosure, for example digital, analog, optical, electrical, fluidic, and the like. In some cases, a sensor, a circuit, and/or a controller may perform one or more signal processing steps on a signal. For instance, sensor, circuit, and/or controller may analyze, modify, and/or synthesize a signal in order to improve the signal, for instance by improving transmission, storage efficiency, or signal to noise ratio.

Exemplary methods of signal processing may include analog, continuous time, discrete, digital, nonlinear, and statistical. Analog signal processing may be performed on non-digitized or analog signals. Exemplary analog processes may include passive filters, active filters, additive mixers, integrators, delay lines, compandors, multipliers, voltage-controlled filters, voltage-controlled oscillators, and phase-locked loops. Continuous-time signal processing may be used, in some cases, to process signals which varying continuously within a domain, for instance time. Exemplary non-limiting continuous time processes may include time domain processing, frequency domain processing (Fourier transform), and complex frequency domain processing. Discrete time signal processing may be used when a signal is sampled non-continuously or at discrete time intervals (i.e., quantized in time). Analog discrete-time signal processing may process a signal using the following exemplary circuits sample and hold circuits, analog time-division multiplexers, analog delay lines and analog feedback shift registers. Digital signal processing may be used to process digitized discrete-time sampled signals. Commonly, digital signal processing may be performed by a computing device or other specialized digital circuits, such as without limitation an application specific integrated circuit (ASIC), a field-programmable gate array (FPGA), or a specialized digital signal processor (DSP). Digital signal processing may be used to perform any combination of typical arithmetical operations, including fixed-point and floating-point, real-valued and complex-valued, multiplication and addition. Digital signal processing may additionally operate circular buffers and lookup tables. Further non-limiting examples of algorithms that may be performed according to digital signal processing techniques include fast Fourier transform (FFT), finite impulse response (FIR) filter, infinite impulse response (IIR) filter, and adaptive filters such as the Wiener and Kalman filters. Statistical signal processing may be used to process a signal as a random function (i.e., a stochastic process), utilizing statistical properties. For instance, in some embodiments, a signal may be modeled with a probability distribution indicating noise, which then may be used to reduce noise in a processed signal.

With continued reference to FIG. 3, system 300 may include a controller 324. Controller 324 may be consistent with any controller disclosed in this disclosure. Controller 324 may be communicatively connected to charging sensor 312. Controller 324 may be communicatively connected to electric vehicle 320. In some embodiments, controller 324 may be disposed within electric vehicle 320. In some embodiments, controller 324 may be a flight controller. Controller 324 may be configured to receive a charging datum from charging sensor 312. Controller 324 may receive charging datum via a wired or wireless communication between controller 324 and charging sensor 312. In one or more embodiments, controller 324 is configured to determine a disruption element as a function of the received charging datum. For purposes of this disclosure, a "disruption element" is an element of information regarding a present-time failure, fault, or degradation of a condition or working order of a charging connection. In one or more embodiments, disruption element may be determined as a function of charging datum, as discussed further in this disclosure.

With continued reference to FIG. 3, in one or more embodiments, there may be outputs, such as charging datum, from charging sensor 312 or any other component present within system 300 may be analog or digital. Onboard or remotely located processors can convert those output signals from charging sensor 312 or sensor suite to a form that is usable by the destination of those signals, such as controller 324. The usable form of output signals from sensors, may be either digital, analog, a combination thereof, or an otherwise unstated form. Processing may be configured to trim, offset, or otherwise compensate the outputs of sensor suite. Based on sensor output, the processor can determine the output to send to downstream component. Controller 324 can include signal amplification, operational amplifier (Op-Amp), filter, digital/analog conversion, linearization circuit, current-voltage change circuits, resistance change circuits such as Wheatstone Bridge, an error compensator circuit, a combination thereof or otherwise undisclosed components. In some embodiments charging sensor 312 may be configured to communicate charging datum, for instance, by way of a network. Exemplary charging datum may include charging characteristics, for example, represented by way of at least a sensor signal. In some cases, charging datum may include one or more of a state of charge of a power source, a temperature of a power source, any other metric associated with power source health, temperature of ambient air, cost of electricity consumed, and the like.

With continued reference to FIG. 3, controller 324 may be configured to disable the charging connection between a charging connector and charging port 304 based on disruption element. In one or more embodiments, if an immediate shutdown via a disablement of the charging connection is initiated, then controller 324 may also generate a signal to notify users, support personnel, safety personnel, flight crew, maintainers, operators, emergency personnel, aircraft computers, or a combination thereof. This signal may be consistent with any alert described in this disclosure. System 300 may include a display. A display may be coupled to electric vehicle 320, a charger, or a remote device. A display may be configured to show a disruption element to a user or to display an alert. The display may be consistent with any display described in this disclosure. In one or more embodiments, controller 324 may be configured to disable the charging connection based on the disruption element. For instance, and without limitation, controller 324 may be configured to detect a charge reduction event, defined for purposes of this disclosure as any temporary or permanent state of a battery cell requiring reduction or cessation of charging. A charge reduction event may include a cell being fully charged and/or a cell undergoing a physical and/or electrical process that makes continued charging at a current voltage and/or current level inadvisable due to a risk that the cell will be damaged, will overheat, or the like. Detection of a charge reduction event may include detection of a temperature of the cell above a preconfigured threshold, detection of a voltage and/or resistance level above or below a preconfigured threshold, or the like.

With continued reference to FIG. 3, in one or more embodiments, disruption element may indicate that energy storage device 316 of electric vehicle 320 is operating outside of an acceptable operation condition represented by a preconfigured threshold (also referred to herein as a "threshold"). For the purposes of this disclosure, a "threshold" is a set desired range and/or value that, if exceeded by a value of charging datum, initiates a specific reaction of controller 324. A specific reaction may be, for example, a disablement command, which is discussed further below in this disclosure. Threshold may be set by, for example, a user or control circuit based on, for example, prior use or an input. In one or more embodiments, if charging datum is determined to be outside of a threshold, a disruption element is determined by controller 324 and a disablement command is generated. For example, and without limitation, charging datum may indicate that energy storage device 316 of electric vehicle 320 has a temperature of 100° F. Such a temperature may be outside of a preconfigured threshold of, for example, 75° F. of an operational condition, such as temperature, of a power source and thus the charging connection may be disabled by controller 324 to prevent overheating of or permanent damage to energy storage device 316. For the purposes of this disclosure, a "disablement command" is a signal transmitted to an electric vehicle providing instructions and/or a command to disable and/or terminate a charging connection between an electric vehicle and a charger. In some embodiments, when controller 324 detects a disruption element, it may send a command to electric vehicle 320 to engage an interlock component 328. In some embodiments, this command may be embedded in the "disablement command" discussed above. In its engaged state, interlock component 328 may electrically connect a load 332 to an energy storage device 316. In its disengaged state, interlock component 328 may not electrically connect load 332 to energy storage device 316. Interlock component 328 may be consistent with any interlock component disclosed in this disclosure. Load 332 may be consistent with any load disclosed in this disclosure. Energy storage device 316 may be consistent with any energy storage unit disclosed in this disclosure. Electric vehicle 320 may be consistent with any electric vehicle disclosed in this disclosure.

Figure 4:
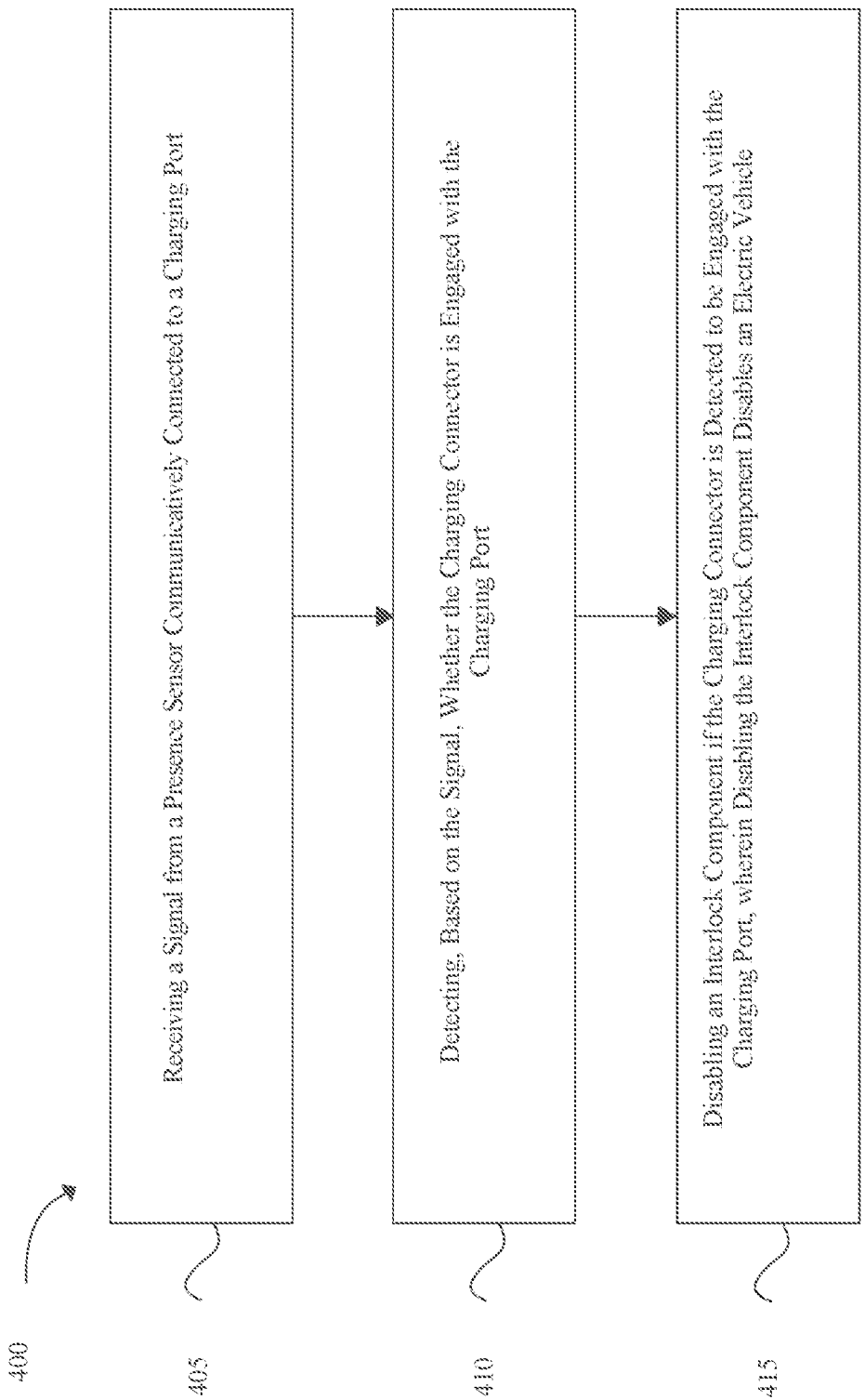
FIG. 4 is a flow chart of a method 400 of disabling an electric vehicle during charging.

Now referring to FIG. 4, an exemplary embodiment of a method 400 of disabling an electric vehicle during charging is shown. Method 400 includes a step 405 of receiving a signal from a presence sensor communicatively connected to a charging port. Presence sensor may be consistent with any presence sensor disclosed in this disclosure. Charging port may be consistent with any charging port disclosed in this disclosure. Method 400 also includes a step 410 of detecting, based on the signal, whether the charging connector is engaged with the charging port. Charging connector may be consistent with any charging connector disclosed in this disclosure. Method 400 further includes a step 415 of disabling an interlock component if the charging connector is detected to be engaged with the charging port, wherein disabling the interlock component disables an electric vehicle. Interlock component may be consistent with any interlock component disclosed in this disclosure. Electric vehicle may be consistent with any electric vehicle disclosed in this disclosure.

With continued reference to FIG. 4, in some embodiments, step 415 may include disabling an electric motor of the electric vehicle. In some embodiments, step 415 may include disabling a set of flight components of the electric vehicle. In some embodiments of step 415, the interlock component may be a relay. Relay may be consistent with any relay disclosed in this disclosure. In some embodiments of method 400, presence sensor may be an electrical sensor. Electrical sensor may be consistent with any electrical sensor disclosed in this disclosure. In some embodiments of method 400, presence sensor may be an electrical sensor. Electrical sensor may be consistent with any electrical sensor disclosed in this disclosure. In some embodiments of method 400, presence sensor may be a Hall effect sensor. Hall effect sensor may be consistent with any Hall effect sensor disclosed in this disclosure. In some embodiments of method 400, presence sensor may be a time-of-flight sensor. Time-of-flight sensor may be consistent with any time-of-flight sensor disclosed in this disclosure. In some embodiments of method 400, presence sensor may be a contact sensor. Contact sensor may be consistent with any contact sensor disclosed in this disclosure. In some embodiments, method 400 may further comprise a step of enabling the interlock component if the charging connector is detected to be disengaged from the charging port, wherein enabling the interlock component enables the electric vehicle.

With continued reference to FIG. 4, method 400 may further include a step of receiving a charging datum from a charging sensor. Charging datum may be consistent with any charging datum disclosed in this disclosure. Charging sensor may be consistent with any charging sensor disclosed in this disclosure. In some embodiments, method 400 may further include a step of determining a disruption element as a function of the charging datum. Disruption element may be consistent with any disruption element disclosed in this disclosure. In some embodiments, method 400 may further include a step of disabling a charging connection between the charging port and the charging connector. In some embodiments, method 400 may further include a step of enabling the interlock component, wherein enabling the interlock component enables the electric vehicle.

Figure 5:
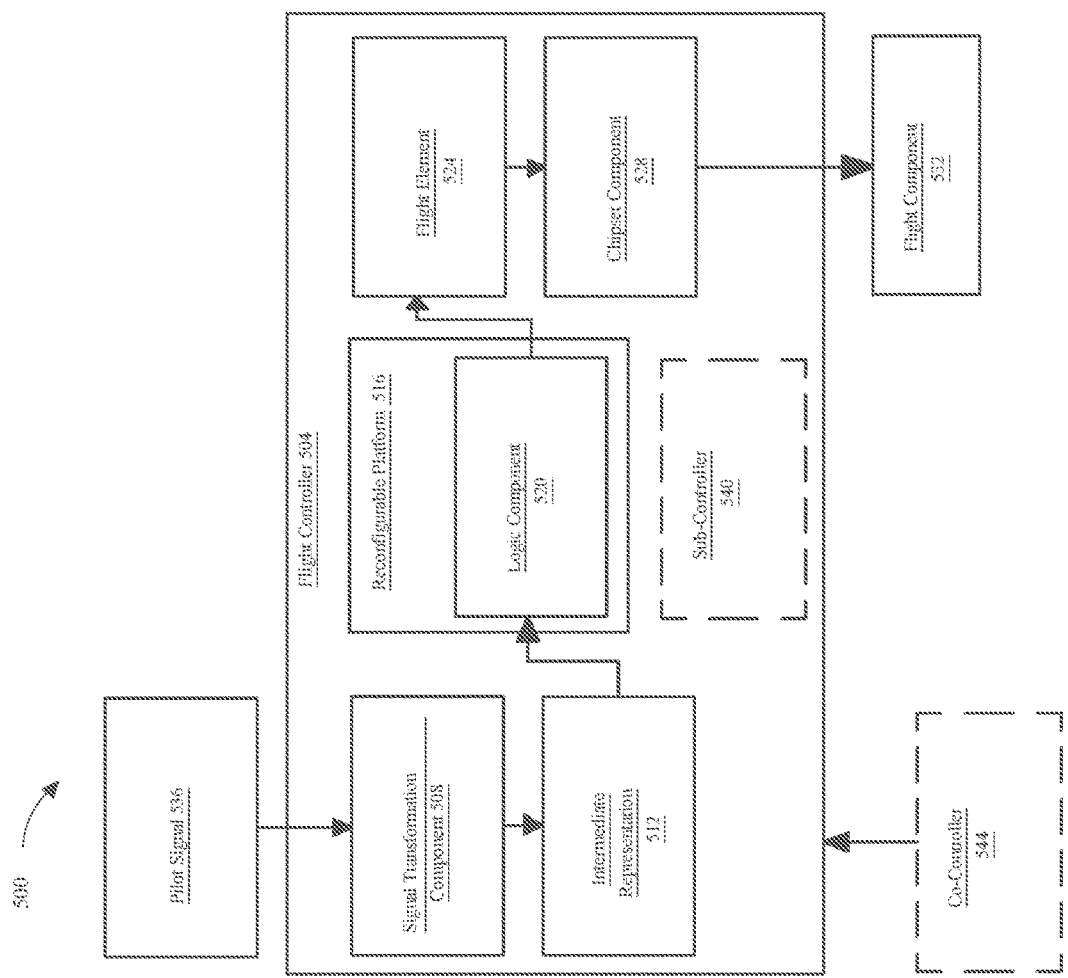
FIG. 5 is a block diagram of an exemplary flight controller.

Now referring to FIG. 5, an exemplary embodiment 500 of a flight controller 504 is illustrated. As used in this disclosure a "flight controller" is a computing device of a plurality of computing devices dedicated to data storage, security, distribution of traffic for load balancing, and flight instruction. Flight controller 504 may include and/or communicate with any computing device as described in this disclosure, including without limitation a microcontroller, microprocessor, digital signal processor (DSP) and/or system on a chip (SoC) as described in this disclosure. Further, flight controller 504 may include a single computing device operating independently, or may include two or more computing device operating in concert, in parallel, sequentially or the like; two or more computing devices may be included together in a single computing device or in two or more computing devices. In embodiments, flight controller 504 may be installed in an aircraft, may control the aircraft remotely, and/or may include an element installed in the aircraft and a remote element in communication therewith.

In an embodiment, and still referring to FIG. 5, flight controller 504 may include a signal transformation component 508. As used in this disclosure a "signal transformation component" is a component that transforms and/or converts a first signal to a second signal, wherein a signal may include one or more digital and/or analog signals. For example, and without limitation, signal transformation component 508 may be configured to perform one or more operations such as preprocessing, lexical analysis, parsing, semantic analysis, and the like thereof. In an embodiment, and without limitation, signal transformation component 508 may include one or more analog-to-digital convertors that transform a first signal of an analog signal to a second signal of a digital signal. For example, and without limitation, an analog-to-digital converter may convert an analog input signal to a 10-bit binary digital representation of that signal. In another embodiment, signal transformation component 508 may include transforming one or more low-level languages such as, but not limited to, machine languages and/or assembly languages. For example, and without limitation, signal transformation component 508 may include transforming a binary language signal to an assembly language signal. In an embodiment, and without limitation, signal transformation component 508 may include transforming one or more high-level languages and/or formal languages such as but not limited to alphabets, strings, and/or languages. For example, and without limitation, high-level languages may include one or more system languages, scripting languages, domain-specific languages, visual languages, esoteric languages, and the like thereof. As a further non-limiting example, high-level languages may include one or more algebraic formula languages, business data languages, string and list languages, object-oriented languages, and the like thereof Still referring to FIG. 5, signal transformation component 508 may be configured to optimize an intermediate representation 512. As used in this disclosure an "intermediate representation" is a data structure and/or code that represents the input signal. Signal transformation component 508 may optimize intermediate representation as a function of a data-flow analysis, dependence analysis, alias analysis, pointer analysis, escape analysis, and the like thereof. In an embodiment, and without limitation, signal transformation component 508 may optimize intermediate representation 512 as a function of one or more inline expansions, dead code eliminations, constant propagation, loop transformations, and/or automatic parallelization functions. In another embodiment, signal transformation component 508 may optimize intermediate representation as a function of a machine dependent optimization such as a peephole optimization, wherein a peephole optimization may rewrite short sequences of code into more efficient sequences of code. Signal transformation component 508 may optimize intermediate representation to generate an output language, wherein an "output language," as used herein, is the native machine language of flight controller 504. For example, and without limitation, native machine language may include one or more binary and/or numerical languages.

In an embodiment, and without limitation, signal transformation component 508 may include transform one or more inputs and outputs as a function of an error correction code. An error correction code, also known as error correcting code (ECC), is an encoding of a message or lot of data using redundant information, permitting recovery of corrupted data. An ECC may include a block code, in which information is encoded on fixed-size packets and/or blocks of data elements such as symbols of predetermined size, bits, or the like. Reed-Solomon coding, in which message symbols within a symbol set having q symbols are encoded as coefficients of a polynomial of degree less than or equal to a natural number k, over a finite field F with q elements; strings so encoded have a minimum hamming distance of k+1, and permit correction of (q-k-1)/2 erroneous symbols. Block code may alternatively or additionally be implemented using Golay coding, also known as binary Golay coding, Bose-Chaudhuri, Hocquenghuem (BCH) coding, multidimensional parity-check coding, and/or Hamming codes. An ECC may alternatively or additionally be based on a convolutional code.

In an embodiment, and still referring to FIG. 5, flight controller 504 may include a reconfigurable hardware platform 516. A "reconfigurable hardware platform," as used herein, is a component and/or unit of hardware that may be reprogrammed, such that, for instance, a data path between elements such as logic gates or other digital circuit elements may be modified to change an algorithm, state, logical sequence, or the like of the component and/or unit. This may be accomplished with such flexible high-speed computing fabrics as field-programmable gate arrays (FPGAs), which may include a grid of interconnected logic gates, connections between which may be severed and/or restored to program in modified logic. Reconfigurable hardware platform 516 may be reconfigured to enact any algorithm and/or algorithm selection process received from another computing device and/or created using machine-learning processes.

Still referring to FIG. 5, reconfigurable hardware platform 516 may include a logic component 520. As used in this disclosure a "logic component" is a component that executes instructions on output language. For example, and without limitation, logic component may perform basic arithmetic, logic, controlling, input/output operations, and the like thereof. Logic component 520 may include any suitable processor, such as without limitation a component incorporating logical circuitry for performing arithmetic and logical operations, such as an arithmetic and logic unit (ALU), which may be regulated with a state machine and directed by operational inputs from memory and/or sensors; logic component 520 may be organized according to Von Neumann and/or Harvard architecture as a non-limiting example. Logic component 520 may include, incorporate, and/or be incorporated in, without limitation, a microcontroller, microprocessor, digital signal processor (DSP), Field Programmable Gate Array (FPGA), Complex Programmable Logic Device (CPLD), Graphical Processing Unit (GPU), general purpose GPU, Tensor Processing Unit (TPU), analog or mixed signal processor, Trusted Platform Module (TPM), a floating point unit (FPU), and/or system on a chip (SoC). In an embodiment, logic component 520 may include one or more integrated circuit microprocessors, which may contain one or more central processing units, central processors, and/or main processors, on a single metal-oxide-semiconductor chip. Logic component 520 may be configured to execute a sequence of stored instructions to be performed on the output language and/or intermediate representation 512. Logic component 520 may be configured to fetch and/or retrieve the instruction from a memory cache, wherein a "memory cache," as used in this disclosure, is a stored instruction set on flight controller 504. Logic component 520 may be configured to decode the instruction retrieved from the memory cache to opcodes and/or operands. Logic component 520 may be configured to execute the instruction on intermediate representation 512 and/or output language. For example, and without limitation, logic component 520 may be configured to execute an addition operation on intermediate representation 512 and/or output language.

In an embodiment, and without limitation, logic component 520 may be configured to calculate a flight element 524. As used in this disclosure a "flight element" is an element of datum denoting a relative status of aircraft. For example, and without limitation, flight element 524 may denote one or more torques, thrusts, airspeed velocities, forces, altitudes, groundspeed velocities, directions during flight, directions facing, forces, orientations, and the like thereof. For example, and without limitation, flight element 524 may denote that aircraft is cruising at an altitude and/or with a sufficient magnitude of forward thrust. As a further non-limiting example, flight status may denote that is building thrust and/or groundspeed velocity in preparation for a takeoff. As a further non-limiting example, flight element 524 may denote that aircraft is following a flight path accurately and/or sufficiently.

Still referring to FIG. 5, flight controller 504 may include a chipset component 528. As used in this disclosure a "chipset component" is a component that manages data flow. In an embodiment, and without limitation, chipset component 528 may include a northbridge data flow path, wherein the northbridge dataflow path may manage data flow from logic component 520 to a high-speed device and/or component, such as a RAM, graphics controller, and the like thereof. In another embodiment, and without limitation, chipset component 528 may include a southbridge data flow path, wherein the southbridge dataflow path may manage data flow from logic component 520 to lower-speed peripheral buses, such as a peripheral component interconnect (PCI), industry standard architecture (ICA), and the like thereof. In an embodiment, and without limitation, southbridge data flow path may include managing data flow between peripheral connections such as ethernet, USB, audio devices, and the like thereof. Additionally or alternatively, chipset component 528 may manage data flow between logic component 520, memory cache, and a flight component 532. As used in this disclosure a "flight component" is a portion of an aircraft that can be moved or adjusted to affect one or more flight elements. For example, flight component532 may include a component used to affect the aircrafts' roll and pitch which may comprise one or more ailerons. As a further example, flight component 532 may include a rudder to control yaw of an aircraft. In an embodiment, chipset component 528 may be configured to communicate with a plurality of flight components as a function of flight element 524. For example, and without limitation, chipset component 528 may transmit to an aircraft rotor to reduce torque of a first lift propulsor and increase the forward thrust produced by a pusher component to perform a flight maneuver.

In an embodiment, and still referring to FIG. 5, flight controller 504 may be configured generate an autonomous function. As used in this disclosure an "autonomous function" is a mode and/or function of flight controller 504 that controls aircraft automatically. For example, and without limitation, autonomous function may perform one or more aircraft maneuvers, take offs, landings, altitude adjustments, flight leveling adjustments, turns, climbs, and/or descents. As a further non-limiting example, autonomous function may adjust one or more airspeed velocities, thrusts, torques, and/or groundspeed velocities. As a further non-limiting example, autonomous function may perform one or more flight path corrections and/or flight path modifications as a function of flight element 524. In an embodiment, autonomous function may include one or more modes of autonomy such as, but not limited to, autonomous mode, semi-autonomous mode, and/or non-autonomous mode. As used in this disclosure "autonomous mode" is a mode that automatically adjusts and/or controls aircraft and/or the maneuvers of aircraft in its entirety. For example, autonomous mode may denote that flight controller 504 will adjust the aircraft. As used in this disclosure a "semi-autonomous mode" is a mode that automatically adjusts and/or controls a portion and/or section of aircraft. For example, and without limitation, semi-autonomous mode may denote that a pilot will control the propulsors, wherein flight controller 504 will control the ailerons and/or rudders. As used in this disclosure "non-autonomous mode" is a mode that denotes a pilot will control aircraft and/or maneuvers of aircraft in its entirety.

In an embodiment, and still referring to FIG. 5, flight controller 504 may generate autonomous function as a function of an autonomous machine-learning model. As used in this disclosure an "autonomous machine-learning model" is a machine-learning model to produce an autonomous function output given flight element 524 and a pilot signal 536 as inputs; this is in contrast to a non-machine learning software program where the commands to be executed are determined in advance by a user and written in a programming language. As used in this disclosure a "pilot signal" is an element of datum representing one or more functions a pilot is controlling and/or adjusting. For example, pilot signal 536 may denote that a pilot is controlling and/or maneuvering ailerons, wherein the pilot is not in control of the rudders and/or propulsors. In an embodiment, pilot signal 536 may include an implicit signal and/or an explicit signal. For example, and without limitation, pilot signal 536 may include an explicit signal, wherein the pilot explicitly states there is a lack of control and/or desire for autonomous function. As a further non-limiting example, pilot signal 536 may include an explicit signal directing flight controller 504 to control and/or maintain a portion of aircraft, a portion of the flight plan, the entire aircraft, and/or the entire flight plan. As a further non-limiting example, pilot signal 536 may include an implicit signal, wherein flight controller 504 detects a lack of control such as by a malfunction, torque alteration, flight path deviation, and the like thereof. In an embodiment, and without limitation, pilot signal 536 may include one or more explicit signals to reduce torque, and/or one or more implicit signals that torque may be reduced due to reduction of airspeed velocity. In an embodiment, and without limitation, pilot signal 536 may include one or more local and/or global signals. For example, and without limitation, pilot signal 536 may include a local signal that is transmitted by a pilot and/or crew member. As a further non-limiting example, pilot signal 536 may include a global signal that is transmitted by air traffic control and/or one or more remote users that are in communication with the pilot of aircraft. In an embodiment, pilot signal 536 may be received as a function of a tri-state bus and/or multiplexor that denotes an explicit pilot signal should be transmitted prior to any implicit or global pilot signal.

Still referring to FIG. 5, autonomous machine-learning model may include one or more autonomous machine-learning processes such as supervised, unsupervised, or reinforcement machine-learning processes that flight controller 504 and/or a remote device may or may not use in the generation of autonomous function. As used in this disclosure "remote device" is an external device to flight controller 504. Additionally or alternatively, autonomous machine-learning model may include one or more autonomous machine-learning processes that a field-programmable gate array (FPGA) may or may not use in the generation of autonomous function. Autonomous machine-learning process may include, without limitation machine learning processes such as simple linear regression, multiple linear regression, polynomial regression, support vector regression, ridge regression, lasso regression, elasticnet regression, decision tree regression, random forest regression, logistic regression, logistic classification, K-nearest neighbors, support vector machines, kernel support vector machines, naïve bayes, decision tree classification, random forest classification, K-means clustering, hierarchical clustering, dimensionality reduction, principal component analysis, linear discriminant analysis, kernel principal component analysis, Q-learning, State Action Reward State Action (SARSA), Deep-Q network, Markov decision processes, Deep Deterministic Policy Gradient (DDPG), or the like thereof.

In an embodiment, and still referring to FIG. 5, autonomous machine learning model may be trained as a function of autonomous training data, wherein autonomous training data may correlate a flight element, pilot signal, and/or simulation data to an autonomous function. For example, and without limitation, a flight element of an airspeed velocity, a pilot signal of limited and/or no control of propulsors, and a simulation data of required airspeed velocity to reach the destination may result in an autonomous function that includes a semi-autonomous mode to increase thrust of the propulsors. Autonomous training data may be received as a function of user-entered valuations of flight elements, pilot signals, simulation data, and/or autonomous functions. Flight controller 504 may receive autonomous training data by receiving correlations of flight element, pilot signal, and/or simulation data to an autonomous function that were previously received and/or determined during a previous iteration of generation of autonomous function. Autonomous training data may be received by one or more remote devices and/or FPGAs that at least correlate a flight element, pilot signal, and/or simulation data to an autonomous function. Autonomous training data may be received in the form of one or more user-entered correlations of a flight element, pilot signal, and/or simulation data to an autonomous function.

Still referring to FIG. 5, flight controller 504 may receive autonomous machine-learning model from a remote device and/or FPGA that utilizes one or more autonomous machine learning processes, wherein a remote device and an FPGA is described above in detail. For example, and without limitation, a remote device may include a computing device, external device, processor, FPGA, microprocessor and the like thereof. Remote device and/or FPGA may perform the autonomous machine-learning process using autonomous training data to generate autonomous function and transmit the output to flight controller 504. Remote device and/or FPGA may transmit a signal, bit, datum, or parameter to flight controller 504 that at least relates to autonomous function. Additionally or alternatively, the remote device and/or FPGA may provide an updated machine-learning model. For example, and without limitation, an updated machine-learning model may be comprised of a firmware update, a software update, an autonomous machine-learning process correction, and the like thereof. As a non-limiting example a software update may incorporate a new simulation data that relates to a modified flight element. Additionally or alternatively, the updated machine learning model may be transmitted to the remote device and/or FPGA, wherein the remote device and/or FPGA may replace the autonomous machine-learning model with the updated machine-learning model and generate the autonomous function as a function of the flight element, pilot signal, and/or simulation data using the updated machine-learning model. The updated machine-learning model may be transmitted by the remote device and/or FPGA and received by flight controller 504 as a software update, firmware update, or corrected autonomous machine-learning model. For example, and without limitation autonomous machine learning model may utilize a neural net machine-learning process, wherein the updated machine-learning model may incorporate a gradient boosting machine-learning process.

Still referring to FIG. 5, flight controller 504 may include, be included in, and/or communicate with a mobile device such as a mobile telephone or smartphone. Further, flight controller may communicate with one or more additional devices as described below in further detail via a network interface device. The network interface device may be utilized for commutatively connecting a flight controller to one or more of a variety of networks, and one or more devices. Examples of a network interface device include, but are not limited to, a network interface card (e.g., a mobile network interface card, a LAN card), a modem, and any combination thereof. Examples of a network include, but are not limited to, a wide area network (e.g., the Internet, an enterprise network), a local area network (e.g., a network associated with an office, a building, a campus or other relatively small geographic space), a telephone network, a data network associated with a telephone/voice provider (e.g., a mobile communications provider data and/or voice network), a direct connection between two computing devices, and any combinations thereof. The network may include any network topology and can may employ a wired and/or a wireless mode of communication.

In an embodiment, and still referring to FIG. 5, flight controller 504 may include, but is not limited to, for example, a cluster of flight controllers in a first location and a second flight controller or cluster of flight controllers in a second location. Flight controller 504 may include one or more flight controllers dedicated to data storage, security, distribution of traffic for load balancing, and the like. Flight controller 504 may be configured to distribute one or more computing tasks as described below across a plurality of flight controllers, which may operate in parallel, in series, redundantly, or in any other manner used for distribution of tasks or memory between computing devices. For example, and without limitation, flight controller 504 may implement a control algorithm to distribute and/or command the plurality of flight controllers. As used in this disclosure a "control algorithm" is a finite sequence of well-defined computer implementable instructions that may determine the flight component of the plurality of flight components to be adjusted. For example, and without limitation, control algorithm may include one or more algorithms that reduce and/or prevent aviation asymmetry. As a further non-limiting example, control algorithms may include one or more models generated as a function of a software including, but not limited to Simulink by MathWorks, Natick, Mass., USA. In an embodiment, and without limitation, control algorithm may be configured to generate an auto-code, wherein an "auto-code," is used herein, is a code and/or algorithm that is generated as a function of the one or more models and/or software's. In another embodiment, control algorithm may be configured to produce a segmented control algorithm. As used in this disclosure a "segmented control algorithm" is control algorithm that has been separated and/or parsed into discrete sections. For example, and without limitation, segmented control algorithm may parse control algorithm into two or more segments, wherein each segment of control algorithm may be performed by one or more flight controllers operating on distinct flight components.

In an embodiment, and still referring to FIG. 5, control algorithm may be configured to determine a segmentation boundary as a function of segmented control algorithm. As used in this disclosure a "segmentation boundary" is a limit and/or delineation associated with the segments of the segmented control algorithm. For example, and without limitation, segmentation boundary may denote that a segment in the control algorithm has a first starting section and/or a first ending section. As a further non-limiting example, segmentation boundary may include one or more boundaries associated with an ability of flight component 532. In an embodiment, control algorithm may be configured to create an optimized signal communication as a function of segmentation boundary. For example, and without limitation, optimized signal communication may include identifying the discrete timing required to transmit and/or receive the one or more segmentation boundaries. In an embodiment, and without limitation, creating optimized signal communication further comprises separating a plurality of signal codes across the plurality of flight controllers. For example, and without limitation the plurality of flight controllers may include one or more formal networks, wherein formal networks transmit data along an authority chain and/or are limited to task-related communications. As a further non-limiting example, communication network may include informal networks, wherein informal networks transmit data in any direction. In an embodiment, and without limitation, the plurality of flight controllers may include a chain path, wherein a "chain path," as used herein, is a linear communication path comprising a hierarchy that data may flow through. In an embodiment, and without limitation, the plurality of flight controllers may include an all-channel path, wherein an "all-channel path," as used herein, is a communication path that is not restricted to a particular direction. For example, and without limitation, data may be transmitted upward, downward, laterally, and the like thereof. In an embodiment, and without limitation, the plurality of flight controllers may include one or more neural networks that assign a weighted value to a transmitted datum. For example, and without limitation, a weighted value may be assigned as a function of one or more signals denoting that a flight component is malfunctioning and/or in a failure state.

Still referring to FIG. 5, the plurality of flight controllers may include a master bus controller. As used in this disclosure a "master bus controller" is one or more devices and/or components that are connected to a bus to initiate a direct memory access transaction, wherein a bus is one or more terminals in a bus architecture. Master bus controller may communicate using synchronous and/or asynchronous bus control protocols. In an embodiment, master bus controller may include flight controller 504. In another embodiment, master bus controller may include one or more universal asynchronous receiver-transmitters (UART). For example, and without limitation, master bus controller may include one or more bus architectures that allow a bus to initiate a direct memory access transaction from one or more buses in the bus architectures. As a further non-limiting example, master bus controller may include one or more peripheral devices and/or components to communicate with another peripheral device and/or component and/or the master bus controller. In an embodiment, master bus controller may be configured to perform bus arbitration. As used in this disclosure "bus arbitration" is method and/or scheme to prevent multiple buses from attempting to communicate with and/or connect to master bus controller. For example and without limitation, bus arbitration may include one or more schemes such as a small computer interface system, wherein a small computer interface system is a set of standards for physical connecting and transferring data between peripheral devices and master bus controller by defining commands, protocols, electrical, optical, and/or logical interfaces. In an embodiment, master bus controller may receive intermediate representation 512 and/or output language from logic component 520, wherein output language may include one or more analog-to-digital conversions, low bit rate transmissions, message encryptions, digital signals, binary signals, logic signals, analog signals, and the like thereof described above in detail.

Still referring to FIG. 5, master bus controller may communicate with a slave bus. As used in this disclosure a "slave bus" is one or more peripheral devices and/or components that initiate a bus transfer. For example, and without limitation, slave bus may receive one or more controls and/or asymmetric communications from master bus controller, wherein slave bus transfers data stored to master bus controller. In an embodiment, and without limitation, slave bus may include one or more internal buses, such as but not limited to a/an internal data bus, memory bus, system bus, front-side bus, and the like thereof. In another embodiment, and without limitation, slave bus may include one or more external buses such as external flight controllers, external computers, remote devices, printers, aircraft computer systems, flight control systems, and the like thereof.

In an embodiment, and still referring to FIG. 5, control algorithm may optimize signal communication as a function of determining one or more discrete timings. For example, and without limitation master bus controller may synchronize timing of the segmented control algorithm by injecting high priority timing signals on a bus of the master bus control. As used in this disclosure a "high priority timing signal" is information denoting that the information is important. For example, and without limitation, high priority timing signal may denote that a section of control algorithm is of high priority and should be analyzed and/or transmitted prior to any other sections being analyzed and/or transmitted. In an embodiment, high priority timing signal may include one or more priority packets. As used in this disclosure a "priority packet" is a formatted unit of data that is communicated between the plurality of flight controllers. For example, and without limitation, priority packet may denote that a section of control algorithm should be used and/or is of greater priority than other sections.

Still referring to FIG. 5, flight controller 504 may also be implemented using a "shared nothing" architecture in which data is cached at the worker, in an embodiment, this may enable scalability of aircraft and/or computing device. Flight controller 504 may include a distributer flight controller. As used in this disclosure a "distributer flight controller" is a component that adjusts and/or controls a plurality of flight components as a function of a plurality of flight controllers. For example, distributer flight controller may include a flight controller that communicates with a plurality of additional flight controllers and/or clusters of flight controllers. In an embodiment, distributed flight control may include one or more neural networks. For example, neural network also known as an artificial neural network, is a network of "nodes," or data structures having one or more inputs, one or more outputs, and a function determining outputs based on inputs. Such nodes may be organized in a network, such as without limitation a convolutional neural network, including an input layer of nodes, one or more intermediate layers, and an output layer of nodes. Connections between nodes may be created via the process of "training" the network, in which elements from a training dataset are applied to the input nodes, a suitable training algorithm (such as Levenberg-Marquardt, conjugate gradient, simulated annealing, or other algorithms) is then used to adjust the connections and weights between nodes in adjacent layers of the neural network to produce the desired values at the output nodes. This process is sometimes referred to as deep learning.

Still referring to FIG. 5, a node may include, without limitation a plurality of inputs $x_i$ that may receive numerical values from inputs to a neural network containing the node and/or from other nodes. Node may perform a weighted sum of inputs using weights $w_i$ that are multiplied by respective inputs $x_i$. Additionally or alternatively, a bias b may be added to the weighted sum of the inputs such that an offset is added to each unit in the neural network layer that is independent of the input to the layer. The weighted sum may then be input into a function φ, which may generate one or more outputs y. Weight $w_i$ applied to an input $x_i$ may indicate whether the input is "excitatory," indicating that it has strong influence on the one or more outputs y, for instance by the corresponding weight having a large numerical value, and/or a "inhibitory," indicating it has a weak effect influence on the one more inputs y, for instance by the corresponding weight having a small numerical value. The values of weights $w_i$ may be determined by training a neural network using training data, which may be performed using any suitable process as described above. In an embodiment, and without limitation, a neural network may receive semantic units as inputs and output vectors representing such semantic units according to weights $w_i$ that are derived using machine-learning processes as described in this disclosure.

Still referring to FIG. 5, flight controller may include a sub-controller 540. As used in this disclosure a "sub-controller" is a controller and/or component that is part of a distributed controller as described above; for instance, flight controller 504 may be and/or include a distributed flight controller made up of one or more sub-controllers. For example, and without limitation, sub-controller 540 may include any controllers and/or components thereof that are similar to distributed flight controller and/or flight controller as described above. Sub-controller 540 may include any component of any flight controller as described above. Sub-controller 540 may be implemented in any manner suitable for implementation of a flight controller as described above. As a further non-limiting example, sub-controller 540 may include one or more processors, logic components and/or computing devices capable of receiving, processing, and/or transmitting data across the distributed flight controller as described above. As a further non-limiting example, sub-controller 540 may include a controller that receives a signal from a first flight controller and/or first distributed flight controller component and transmits the signal to a plurality of additional sub-controllers and/or flight components.

Still referring to FIG. 5, flight controller may include a co-controller 544. As used in this disclosure a "co-controller" is a controller and/or component that joins flight controller 504 as components and/or nodes of a distributer flight controller as described above. For example, and without limitation, co-controller 544 may include one or more controllers and/or components that are similar to flight controller 504. As a further non-limiting example, co-controller 544 may include any controller and/or component that joins flight controller 504 to distributer flight controller. As a further non-limiting example, co-controller 544 may include one or more processors, logic components and/or computing devices capable of receiving, processing, and/or transmitting data to and/or from flight controller 504 to distributed flight control system. Co-controller 544 may include any component of any flight controller as described above. Co-controller 544 may be implemented in any manner suitable for implementation of a flight controller as described above.

In an embodiment, and with continued reference to FIG. 5, flight controller 504 may be designed and/or configured to perform any method, method step, or sequence of method steps in any embodiment described in this disclosure, in any order and with any degree of repetition. For instance, flight controller 504 may be configured to perform a single step or sequence repeatedly until a desired or commanded outcome is achieved; repetition of a step or a sequence of steps may be performed iteratively and/or recursively using outputs of previous repetitions as inputs to subsequent repetitions, aggregating inputs and/or outputs of repetitions to produce an aggregate result, reduction or decrement of one or more variables such as global variables, and/or division of a larger processing task into a set of iteratively addressed smaller processing tasks. Flight controller may perform any step or sequence of steps as described in this disclosure in parallel, such as simultaneously and/or substantially simultaneously performing a step two or more times using two or more parallel threads, processor cores, or the like; division of tasks between parallel threads and/or processes may be performed according to any protocol suitable for division of tasks between iterations. Persons skilled in the art, upon reviewing the entirety of this disclosure, will be aware of various ways in which steps, sequences of steps, processing tasks, and/or data may be subdivided, shared, or otherwise dealt with using iteration, recursion, and/or parallel processing.

Figure 6:
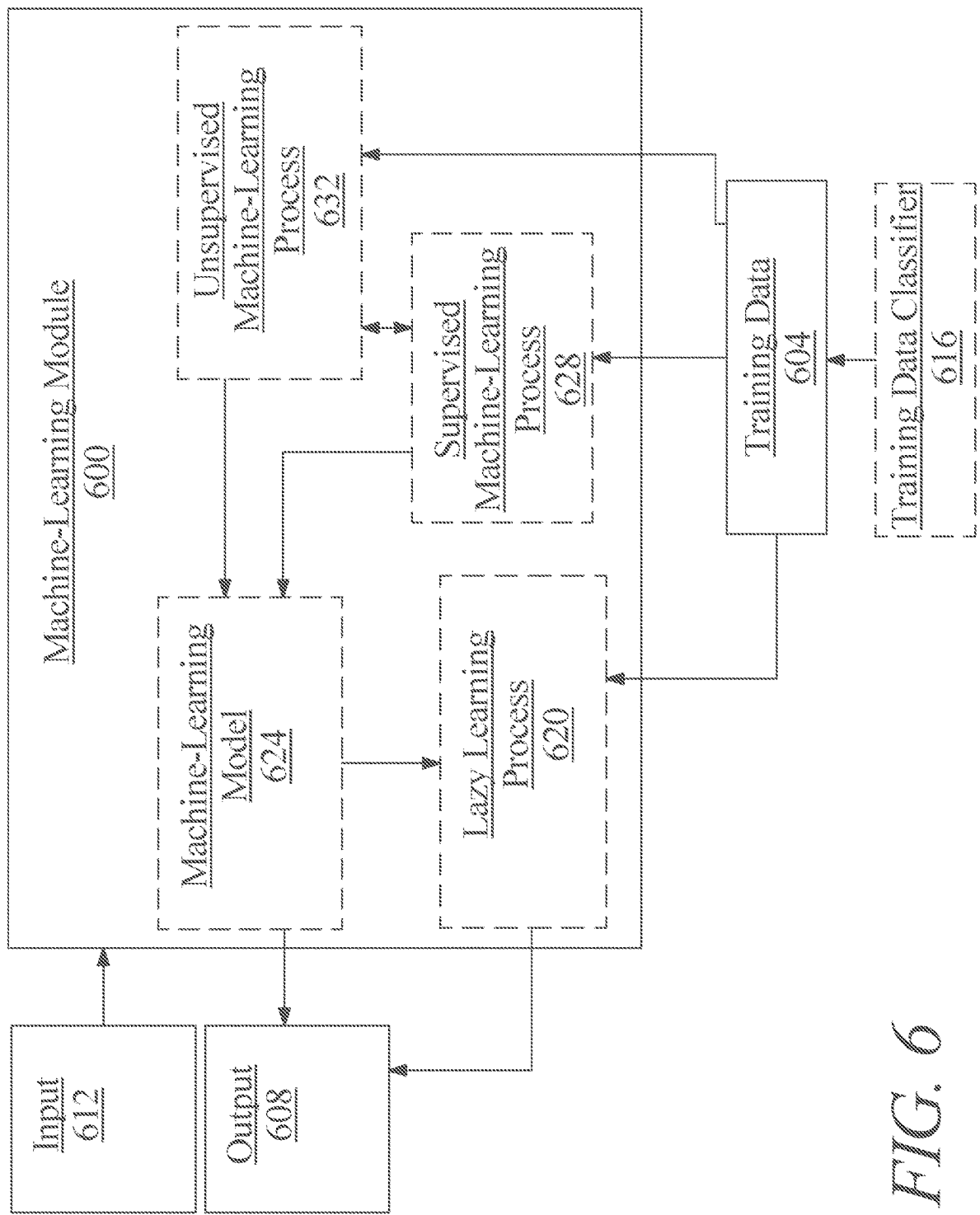
FIG. 6 is a block diagram of an exemplary machine learning module.

Referring now to FIG. 6, an exemplary embodiment of a machine-learning module 600 that may perform one or more machine-learning processes as described in this disclosure is illustrated. Machine-learning module may perform determinations, classification, and/or analysis steps, methods, processes, or the like as described in this disclosure using machine learning processes. A "machine learning process," as used in this disclosure, is a process that automatedly uses training data 604 to generate an algorithm that will be performed by a computing device/module to produce outputs 608 given data provided as inputs 612; this is in contrast to a non-machine learning software program where the commands to be executed are determined in advance by a user and written in a programming language.

Still referring to FIG. 6, "training data," as used herein, is data containing correlations that a machine-learning process may use to model relationships between two or more categories of data elements. For instance, and without limitation, training data 604 may include a plurality of data entries, each entry representing a set of data elements that were recorded, received, and/or generated together; data elements may be correlated by shared existence in a given data entry, by proximity in a given data entry, or the like. Multiple data entries in training data 604 may evince one or more trends in correlations between categories of data elements; for instance, and without limitation, a higher value of a first data element belonging to a first category of data element may tend to correlate to a higher value of a second data element belonging to a second category of data element, indicating a possible proportional or other mathematical relationship linking values belonging to the two categories. Multiple categories of data elements may be related in training data 604 according to various correlations; correlations may indicate causative and/or predictive links between categories of data elements, which may be modeled as relationships such as mathematical relationships by machine-learning processes as described in further detail below. Training data 604 may be formatted and/or organized by categories of data elements, for instance by associating data elements with one or more descriptors corresponding to categories of data elements. As a non-limiting example, training data 604 may include data entered in standardized forms by persons or processes, such that entry of a given data element in a given field in a form may be mapped to one or more descriptors of categories. Elements in training data 604 may be linked to descriptors of categories by tags, tokens, or other data elements; for instance, and without limitation, training data 604 may be provided in fixed-length formats, formats linking positions of data to categories such as comma-separated value (CSV) formats and/or self-describing formats such as extensible markup language (XML), JavaScript Object Notation (JSON), or the like, enabling processes or devices to detect categories of data.

Alternatively or additionally, and continuing to refer to FIG. 6, training data 604 may include one or more elements that are not categorized; that is, training data 604 may not be formatted or contain descriptors for some elements of data. Machine-learning algorithms and/or other processes may sort training data 604 according to one or more categorizations using, for instance, natural language processing algorithms, tokenization, detection of correlated values in raw data and the like; categories may be generated using correlation and/or other processing algorithms. As a non-limiting example, in a corpus of text, phrases making up a number "n" of compound words, such as nouns modified by other nouns, may be identified according to a statistically significant prevalence of n-grams containing such words in a particular order; such an n-gram may be categorized as an element of language such as a "word" to be tracked similarly to single words, generating a new category as a result of statistical analysis. Similarly, in a data entry including some textual data, a person's name may be identified by reference to a list, dictionary, or other compendium of terms, permitting ad-hoc categorization by machine-learning algorithms, and/or automated association of data in the data entry with descriptors or into a given format. The ability to categorize data entries automatedly may enable the same training data 604 to be made applicable for two or more distinct machine-learning algorithms as described in further detail below. Training data 604 used by machine-learning module 600 may correlate any input data as described in this disclosure to any output data as described in this disclosure. As a non-limiting illustrative example flight elements and/or pilot signals may be inputs, wherein an output may be an autonomous function.

Further referring to FIG. 6, training data may be filtered, sorted, and/or selected using one or more supervised and/or unsupervised machine-learning processes and/or models as described in further detail below; such models may include without limitation a training data classifier 616. Training data classifier 616 may include a "classifier," which as used in this disclosure is a machine-learning model as defined below, such as a mathematical model, neural net, or program generated by a machine learning algorithm known as a "classification algorithm," as described in further detail below, that sorts inputs into categories or bins of data, outputting the categories or bins of data and/or labels associated therewith. A classifier may be configured to output at least a datum that labels or otherwise identifies a set of data that are clustered together, found to be close under a distance metric as described below, or the like. Machine-learning module 600 may generate a classifier using a classification algorithm, defined as a processes whereby a computing device and/or any module and/or component operating thereon derives a classifier from training data 604. Classification may be performed using, without limitation, linear classifiers such as without limitation logistic regression and/or naive Bayes classifiers, nearest neighbor classifiers such as k-nearest neighbors classifiers, support vector machines, least squares support vector machines, fisher's linear discriminant, quadratic classifiers, decision trees, boosted trees, random forest classifiers, learning vector quantization, and/or neural network-based classifiers. As a non-limiting example, training data classifier 416 may classify elements of training data to sub-categories of flight elements such as torques, forces, thrusts, directions, and the like thereof.

Still referring to FIG. 6, machine-learning module 600 may be configured to perform a lazy-learning process 620 and/or protocol, which may alternatively be referred to as a "lazy loading" or "call-when-needed" process and/or protocol, may be a process whereby machine learning is conducted upon receipt of an input to be converted to an output, by combining the input and training set to derive the algorithm to be used to produce the output on demand. For instance, an initial set of simulations may be performed to cover an initial heuristic and/or "first guess" at an output and/or relationship. As a non-limiting example, an initial heuristic may include a ranking of associations between inputs and elements of training data 604. Heuristic may include selecting some number of highest-ranking associations and/or training data 604 elements. Lazy learning may implement any suitable lazy learning algorithm, including without limitation a K-nearest neighbors algorithm, a lazy naïve Bayes algorithm, or the like; persons skilled in the art, upon reviewing the entirety of this disclosure, will be aware of various lazy-learning algorithms that may be applied to generate outputs as described in this disclosure, including without limitation lazy learning applications of machine-learning algorithms as described in further detail below.

Alternatively or additionally, and with continued reference to FIG. 6, machine-learning processes as described in this disclosure may be used to generate machine-learning models 624. A "machine-learning model," as used in this disclosure, is a mathematical and/or algorithmic representation of a relationship between inputs and outputs, as generated using any machine-learning process including without limitation any process as described above, and stored in memory; an input is submitted to a machine-learning model 624 once created, which generates an output based on the relationship that was derived. For instance, and without limitation, a linear regression model, generated using a linear regression algorithm, may compute a linear combination of input data using coefficients derived during machine-learning processes to calculate an output datum. As a further non-limiting example, a machine-learning model 624 may be generated by creating an artificial neural network, such as a convolutional neural network comprising an input layer of nodes, one or more intermediate layers, and an output layer of nodes. Connections between nodes may be created via the process of "training" the network, in which elements from a training data 604 set are applied to the input nodes, a suitable training algorithm (such as Levenberg-Marquardt, conjugate gradient, simulated annealing, or other algorithms) is then used to adjust the connections and weights between nodes in adjacent layers of the neural network to produce the desired values at the output nodes. This process is sometimes referred to as deep learning.

Still referring to FIG. 6, machine-learning algorithms may include at least a supervised machine-learning process 628. At least a supervised machine-learning process 628, as defined herein, include algorithms that receive a training set relating a number of inputs to a number of outputs, and seek to find one or more mathematical relations relating inputs to outputs, where each of the one or more mathematical relations is optimal according to some criterion specified to the algorithm using some scoring function. For instance, a supervised learning algorithm may include flight elements and/or pilot signals as described above as inputs, autonomous functions as outputs, and a scoring function representing a desired form of relationship to be detected between inputs and outputs; scoring function may, for instance, seek to maximize the probability that a given input and/or combination of elements inputs is associated with a given output to minimize the probability that a given input is not associated with a given output. Scoring function may be expressed as a risk function representing an "expected loss" of an algorithm relating inputs to outputs, where loss is computed as an error function representing a degree to which a prediction generated by the relation is incorrect when compared to a given input-output pair provided in training data 604. Persons skilled in the art, upon reviewing the entirety of this disclosure, will be aware of various possible variations of at least a supervised machine-learning process 628 that may be used to determine relation between inputs and outputs. Supervised machine-learning processes may include classification algorithms as defined above.

Further referring to FIG. 6, machine learning processes may include at least an unsupervised machine-learning processes 632. An unsupervised machine-learning process, as used herein, is a process that derives inferences in datasets without regard to labels; as a result, an unsupervised machine-learning process may be free to discover any structure, relationship, and/or correlation provided in the data. Unsupervised processes may not require a response variable; unsupervised processes may be used to find interesting patterns and/or inferences between variables, to determine a degree of correlation between two or more variables, or the like.

Still referring to FIG. 6, machine-learning module 600 may be designed and configured to create a machine-learning model 624 using techniques for development of linear regression models. Linear regression models may include ordinary least squares regression, which aims to minimize the square of the difference between predicted outcomes and actual outcomes according to an appropriate norm for measuring such a difference (e.g. a vector-space distance norm); coefficients of the resulting linear equation may be modified to improve minimization. Linear regression models may include ridge regression methods, where the function to be minimized includes the least-squares function plus term multiplying the square of each coefficient by a scalar amount to penalize large coefficients. Linear regression models may include least absolute shrinkage and selection operator (LASSO) models, in which ridge regression is combined with multiplying the least-squares term by a factor of 1 divided by double the number of samples. Linear regression models may include a multi-task lasso model wherein the norm applied in the least-squares term of the lasso model is the Frobenius norm amounting to the square root of the sum of squares of all terms. Linear regression models may include the elastic net model, a multi-task elastic net model, a least angle regression model, a LARS lasso model, an orthogonal matching pursuit model, a Bayesian regression model, a logistic regression model, a stochastic gradient descent model, a perceptron model, a passive aggressive algorithm, a robustness regression model, a Huber regression model, or any other suitable model that may occur to persons skilled in the art upon reviewing the entirety of this disclosure. Linear regression models may be generalized in an embodiment to polynomial regression models, whereby a polynomial equation (e.g. a quadratic, cubic or higher-order equation) providing a best predicted output/actual output fit is sought; similar methods to those described above may be applied to minimize error functions, as will be apparent to persons skilled in the art upon reviewing the entirety of this disclosure.

Continuing to refer to FIG. 6, machine-learning algorithms may include, without limitation, linear discriminant analysis. Machine-learning algorithm may include quadratic discriminate analysis. Machine-learning algorithms may include kernel ridge regression. Machine-learning algorithms may include support vector machines, including without limitation support vector classification-based regression processes. Machine-learning algorithms may include stochastic gradient descent algorithms, including classification and regression algorithms based on stochastic gradient descent. Machine-learning algorithms may include nearest neighbors algorithms. Machine-learning algorithms may include Gaussian processes such as Gaussian Process Regression. Machine-learning algorithms may include cross-decomposition algorithms, including partial least squares and/or canonical correlation analysis. Machine-learning algorithms may include naïve Bayes methods. Machine-learning algorithms may include algorithms based on decision trees, such as decision tree classification or regression algorithms. Machine-learning algorithms may include ensemble methods such as bagging meta-estimator, forest of randomized tress, AdaBoost, gradient tree boosting, and/or voting classifier methods. Machine-learning algorithms may include neural net algorithms, including convolutional neural net processes.

It is to be noted that any one or more of the aspects and embodiments described herein may be conveniently implemented using one or more machines (e.g., one or more computing devices that are utilized as a user computing device for an electronic document, one or more server devices, such as a document server, etc.) programmed according to the teachings of the present specification, as will be apparent to those of ordinary skill in the computer art. Appropriate software coding can readily be prepared by skilled programmers based on the teachings of the present disclosure, as will be apparent to those of ordinary skill in the software art. Aspects and implementations discussed above employing software and/or software modules may also include appropriate hardware for assisting in the implementation of the machine executable instructions of the software and/or software module Such software may also include information (e.g., data) carried as a data signal on a data carrier, such as a carrier wave. For example, machine-executable information may be included as a data-carrying signal embodied in a data carrier in which the signal encodes a sequence of instruction, or portion thereof, for execution by a machine (e.g., a computing device) and any related information (e.g., data structures and data) that causes the machine to perform any one of the methodologies and/or embodiments described herein.

Examples of a computing device include, but are not limited to, an electronic book reading device, a computer workstation, a terminal computer, a server computer, a handheld device (e.g., a tablet computer, a smartphone, etc.), a web appliance, a network router, a network switch, a network bridge, any machine capable of executing a sequence of instructions that specify an action to be taken by that machine, and any combinations thereof. In one example, a computing device may include and/or be included in a kiosk.

Figure 7:
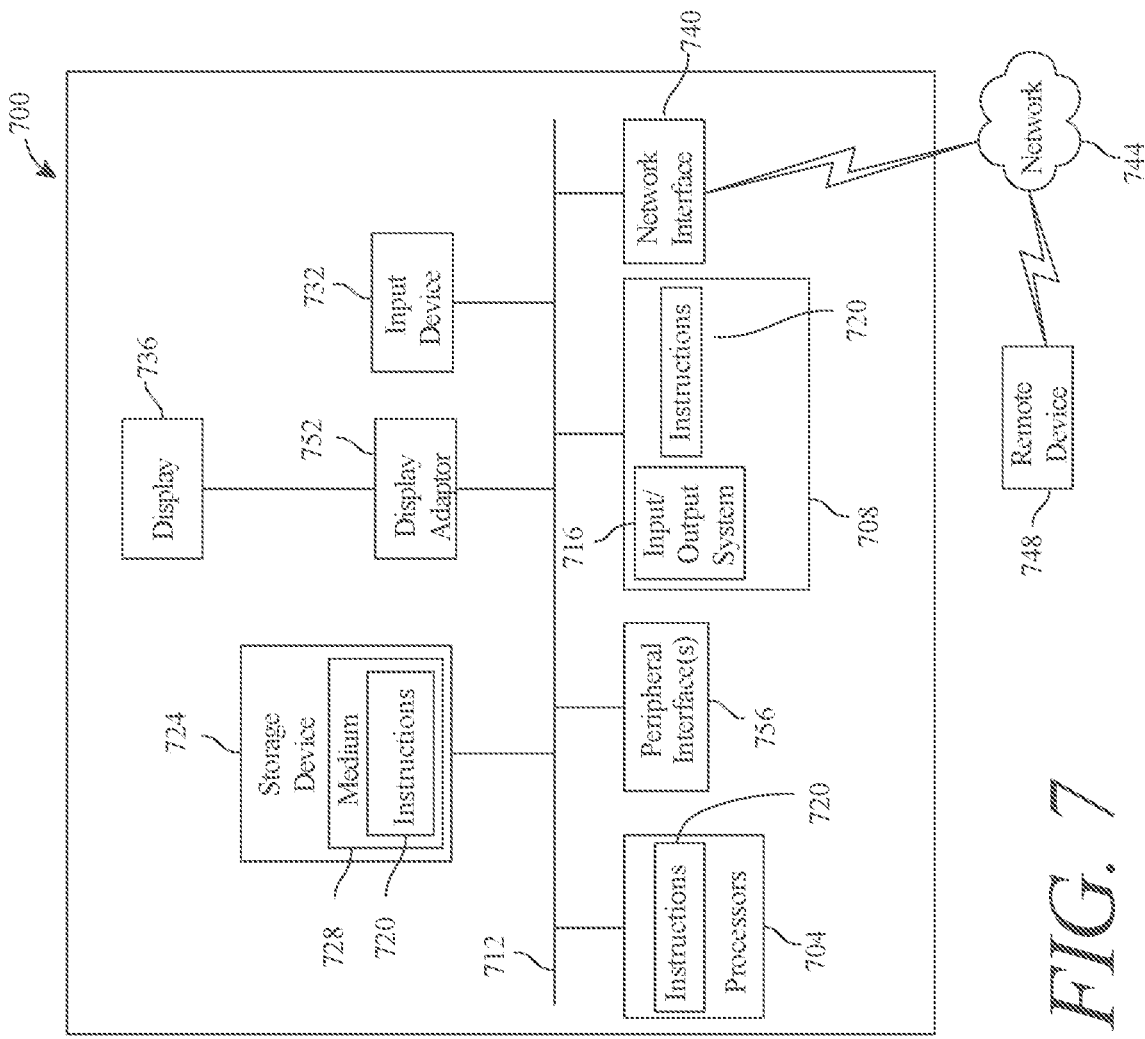
FIG. 7 is a block diagram of a computing system that can be used to implement any one or more of the methodologies disclosed herein and any one or more portions thereof. The drawings are not necessarily to scale and may be illustrated by phantom lines, diagrammatic representations and fragmentary views. In certain instances, details that are not necessary for an understanding of the embodiments or that render other details difficult to perceive may have been omitted.

FIG. 7 shows a diagrammatic representation of one embodiment of a computing device in the exemplary form of a computer system 700 within which a set of instructions for causing a control system to perform any one or more of the aspects and/or methodologies of the present disclosure may be executed. It is also contemplated that multiple computing devices may be utilized to implement a specially configured set of instructions for causing one or more of the devices to perform any one or more of the aspects and/or methodologies of the present disclosure. Computer system 700 includes a processor 704 and a memory 708 that communicate with each other, and with other components, via a bus 712. Bus 712 may include any of several types of bus structures including, but not limited to, a memory bus, a memory controller, a peripheral bus, a local bus, and any combinations thereof, using any of a variety of bus architectures.

Processor 704 may include any suitable processor, such as without limitation a processor incorporating logical circuitry for performing arithmetic and logical operations, such as an arithmetic and logic unit (ALU), which may be regulated with a state machine and directed by operational inputs from memory and/or sensors; processor 704 may be organized according to Von Neumann and/or Harvard architecture as a non-limiting example. Processor 704 may include, incorporate, and/or be incorporated in, without limitation, a microcontroller, microprocessor, digital signal processor (DSP), Field Programmable Gate Array (FPGA), Complex Programmable Logic Device (CPLD), Graphical Processing Unit (GPU), general purpose GPU, Tensor Processing Unit (TPU), analog or mixed signal processor, Trusted Platform Module (TPM), a floating point unit (FPU), and/or system on a chip (SoC).

Memory 708 may include various components (e.g., machine-readable media) including, but not limited to, a random-access memory component, a read only component, and any combinations thereof. In one example, a basic input/output system 716 (BIOS), including basic routines that help to transfer information between elements within computer system 700, such as during start-up, may be stored in memory 708. Memory 708 may also include (e.g., stored on one or more machine-readable media) instructions (e.g., software) 720 embodying any one or more of the aspects and/or methodologies of the present disclosure. In another example, memory 708 may further include any number of program modules including, but not limited to, an operating system, one or more application programs, other program modules, program data, and any combinations thereof.

Computer system 700 may also include a storage device 724. Examples of a storage device (e.g., storage device 724) include, but are not limited to, a hard disk drive, a magnetic disk drive, an optical disc drive in combination with an optical medium, a solid-state memory device, and any combinations thereof. Storage device 724 may be connected to bus 712 by an appropriate interface (not shown). Example interfaces include, but are not limited to, SCSI, advanced technology attachment (ATA), serial ATA, universal serial bus (USB), IEEE 1394 (FIREWIRE), and any combinations thereof. In one example, storage device 724 (or one or more components thereof) may be removably interfaced with computer system 700 (e.g., via an external port connector (not shown)). Particularly, storage device 724 and an associated machine-readable medium 728 may provide nonvolatile and/or volatile storage of machine-readable instructions, data structures, program modules, and/or other data for computer system 700. In one example, software 720 may reside, completely or partially, within machine-readable medium 728. In another example, software 720 may reside, completely or partially, within processor 704.

Computer system 700 may also include an input device 732. In one example, a user of computer system 700 may enter commands and/or other information into computer system 700 via input device 732. Examples of an input device 732 include, but are not limited to, an alpha-numeric input device (e.g., a keyboard), a pointing device, a joystick, a gamepad, an audio input device (e.g., a microphone, a voice response system, etc.), a cursor control device (e.g., a mouse), a touchpad, an optical scanner, a video capture device (e.g., a still camera, a video camera), a touchscreen, and any combinations thereof Input device 732 may be interfaced to bus 712 via any of a variety of interfaces (not shown) including, but not limited to, a serial interface, a parallel interface, a game port, a USB interface, a FIRE-WIRE interface, a direct interface to bus 712, and any combinations thereof. Input device 732 may include a touch screen interface that may be a part of or separate from display 736, discussed further below. Input device 732 may be utilized as a user selection device for selecting one or more graphical representations in a graphical interface as described above.

A user may also input commands and/or other information to computer system 700 via storage device 724 (e.g., a removable disk drive, a flash drive, etc.) and/or network interface device 740. A network interface device, such as network interface device 740, may be utilized for connecting computer system 700 to one or more of a variety of networks, such as network 744, and one or more remote devices 748 connected thereto. Examples of a network interface device include, but are not limited to, a network interface card (e.g., a mobile network interface card, a LAN card), a modem, and any combination thereof. Examples of a network include, but are not limited to, a wide area network (e.g., the Internet, an enterprise network), a local area network (e.g., a network associated with an office, a building, a campus or other relatively small geographic space), a telephone network, a data network associated with a telephone/voice provider (e.g., a mobile communications provider data and/or voice network), a direct connection between two computing devices, and any combinations thereof. A network, such as network 744, may employ a wired and/or a wireless mode of communication. In general, any network topology may be used. Information (e.g., data, software 720, etc.) may be communicated to and/or from computer system 700 via network interface device 740.

Computer system 700 may further include a video display adapter 752 for communicating a displayable image to a display device, such as display device 736. Examples of a display device include, but are not limited to, a liquid crystal display (LCD), a cathode ray tube (CRT), a plasma display, a light emitting diode (LED) display, and any combinations thereof. Display adapter 752 and display device 736 may be utilized in combination with processor 704 to provide graphical representations of aspects of the present disclosure. In addition to a display device, computer system 700 may include one or more other peripheral output devices including, but not limited to, an audio speaker, a printer, and any combinations thereof. Such peripheral output devices may be connected to bus 712 via a peripheral interface 756. Examples of a peripheral interface include, but are not limited to, a serial port, a USB connection, a FIREWIRE connection, a parallel connection, and any combinations thereof The foregoing has been a detailed description of illustrative embodiments of the invention. Various modifications and additions can be made without departing from the spirit and scope of this invention. Features of each of the various embodiments described above may be combined with features of other described embodiments as appropriate in order to provide a multiplicity of feature combinations in associated new embodiments. Furthermore, while the foregoing describes a number of separate embodiments, what has been described herein is merely illustrative of the application of the principles of the present invention. Additionally, although particular methods herein may be illustrated and/or described as being performed in a specific order, the ordering is highly variable within ordinary skill to systems and methods according to the present disclosure. Accordingly, this description is meant to be taken only by way of example, and not to otherwise limit the scope of this invention.

Exemplary embodiments have been disclosed above and illustrated in the accompanying drawings. It will be understood by those skilled in the art that various changes, omissions and additions may be made to that which is specifically disclosed herein without departing from the spirit and scope of the present invention.

What is claimed is:

1. A system for disabling an electric vehicle during charging, comprising:
    an energy storage device, the energy storage device attached to an electric vehicle;
    a charging port, the charging port disposed on the electric vehicle and electrically connected to the energy storage device to create a charging connection between the charging port and the charging connector, wherein the charging port is configured to engage with a charging connector;
    a charging sensor, the charging sensor configured to:
        detect a charging characteristic of the charging port; and
        generate a charging datum based on the charging characteristic;
    a presence sensor, the presence sensor communicatively connected to the charging port, the presence sensor configured to detect whether the charging connector is engaged with the charging port;
    an interlock component, the interlock component configured to disable the electric vehicle when the charging connector is engaged with the charging port, wherein disabling the electric vehicle comprises disconnecting the energy storage device from a load of the electric vehicle such that the energy storage device and the load are not electrically connected; and
    a controller, the controller configured to:
        receive the charging datum from the charging sensor;
        determine a disruption element as a function of the charging datum;
        disable the charging connection; and
        enable the interlock component.

2. The system of claim 1, wherein disabling the electric vehicle during charging when the charging connector is engaged with the charging port comprises disabling an electric motor of the electric vehicle.

3. The system of claim 1, wherein disabling the electric vehicle during charging when the charging connector is engaged with the charging port comprises disabling a set of flight components of the electric vehicle.

4. The system of claim 1, wherein the interlock component is a relay.

5. The system of claim 1, wherein the presence sensor is an electrical sensor.

6. The system of claim 1, wherein the presence sensor is a Hall effect sensor.

7. The system of claim 1, wherein the presence sensor is a time-of-flight sensor.

8. The system of claim 1, wherein the presence sensor is a contact sensor.

9. The system of claim 1, wherein the interlock component is further configured to enable the electric vehicle when the charging connector is disengaged from the charging port.

10. A method of disabling an electric vehicle during charging, comprising:
    receiving a signal from a presence sensor communicatively connected to a charging port of an electric vehicle;
    detecting, based on the signal, whether a charging connector is engaged with the charging port to create a charging connection between the charging port and the charging connector;
    receiving a charging datum from a charging sensor;
    disabling an interlock component if the charging connector is detected to be engaged with the charging port, wherein disabling the interlock component disables an electric vehicle, wherein disabling the electric vehicle comprises disconnecting the energy storage device from a load of the electric vehicle such that the energy storage device and the load are not electrically connected;
    determining a disruption element as a function of the charging datum;
    disabling the charging connection between the charging port and the charging connector; and
    enabling the interlock component, wherein enabling the interlock component enables the electric vehicle.

11. The method of claim 10, wherein the step of disabling an interlock component if the charging connector is detected to be engaged with the charging port comprises disabling an electric motor of the electric vehicle.

12. The method of claim 10, wherein the step of disabling an interlock component if the charging connector is detected to be engaged with the charging port comprises disabling a set of flight components of the electric vehicle.

13. The method of claim 10, wherein the interlock component is a relay.

14. The method of claim 10, wherein the presence sensor is an electrical sensor.

15. The method of claim 10, wherein the presence sensor is a Hall effect sensor.

16. The method of claim 10, wherein the presence sensor is a time-of-flight sensor.

17. The method of claim 10, wherein the presence sensor is a contact sensor.

18. The method of claim 10, further comprising enabling the interlock component if the charging connector is detected to be disengaged from the charging port.

19. The system of claim 1, wherein enabling the electric vehicle comprises electrically connecting the energy storage device and a load.

20. The method of claim 1, wherein enabling the electric vehicle comprises electrically connecting and energy storage device of the electric vehicle and a load.

* * * * *